(12) United States Patent
Cline et al.

(10) Patent No.: US 12,378,444 B2
(45) Date of Patent: Aug. 5, 2025

(54) PRESSURE SENSITIVE ADHESIVE BUILDING SURFACE ACCESSORY

(71) Applicant: CertainTeed Gypsum, Inc., Malvern, PA (US)

(72) Inventors: Stephen Cline, Bend, OR (US); Craig D. Radford, Lake Tapps, WA (US); Michael House, Bend, OR (US)

(73) Assignee: CertainTeed Gypsum, Inc., Malvern, PA (US)

( * ) Notice: Subject to any disclaimer, the term of this patent is extended or adjusted under 35 U.S.C. 154(b) by 278 days.

(21) Appl. No.: 17/886,882

(22) Filed: Aug. 12, 2022

(65) Prior Publication Data

US 2023/0052281 A1   Feb. 16, 2023

Related U.S. Application Data

(60) Provisional application No. 63/352,079, filed on Jun. 14, 2022, provisional application No. 63/233,007, filed on Aug. 13, 2021.

(51) Int. Cl.
*C09J 7/38* (2018.01)
*C09J 5/04* (2006.01)
*C09J 7/20* (2018.01)

(52) U.S. Cl.
CPC . *C09J 7/38* (2018.01); *C09J 5/04* (2013.01); *C09J 7/20* (2018.01); *C09J 2203/346* (2020.08);

(Continued)

(58) Field of Classification Search
CPC ......... C09J 7/20; C09J 7/38; C09J 5/04; C09J 2203/346; C09J 2301/21; C09J 2301/302; E04F 13/06

(Continued)

(56) References Cited

U.S. PATENT DOCUMENTS

| 290,750 | A | * | 12/1883 | Cunha | E04F 13/06 |
| | | | | | 52/255 |
| 2,667,436 | A | * | 1/1954 | Goepfert | B32B 37/1292 |
| | | | | | 51/303 |

(Continued)

FOREIGN PATENT DOCUMENTS

| EP | 2082674 A1 | 7/2009 |
| JP | 2000345115 A | * 12/2000 |

(Continued)

OTHER PUBLICATIONS

International Search Report and Written Opinion for International Application No. PCT/US2022/040170 mailed on Dec. 1, 2022, 11 pages.

*Primary Examiner* — James M Ference
(74) *Attorney, Agent, or Firm* — McDonnell Boehnen Hulbert & Berghoff LLP

(57) ABSTRACT

The present disclosure relates a building surface accessory comprising an elongated body having a length that extends from a first end to a second end, the elongated body having an inside surface, an outside surface, a first edge, and a second edge, and an adhesive sheet having an outside surface coupled to the elongated body, an inside surface, and pressure sensitive adhesive on at least a portion of the inside surface, wherein the adhesive sheet is embossed such that the pressure sensitive adhesive has a plurality of raised portions.

20 Claims, 15 Drawing Sheets

(52) U.S. Cl.
CPC ...... *C09J 2301/21* (2020.08); *C09J 2301/302* (2020.08)

(58) Field of Classification Search
USPC .................... 52/255, 287.1, 746.1
See application file for complete search history.

(56) References Cited

U.S. PATENT DOCUMENTS

| | | | | |
|---|---|---|---|---|
| 2,861,006 A * | 11/1958 | Salditt | ................ | C09J 7/20 442/151 |
| 2,862,264 A * | 12/1958 | Perna | ................ | E04F 19/028 52/287.1 |
| 2,904,856 A * | 9/1959 | Robinson | ................ | E04F 13/06 52/255 |
| 3,085,572 A * | 4/1963 | Blackford | ................ | A61F 13/0206 442/151 |
| 3,214,502 A * | 10/1965 | Schaar | ................ | B26D 7/08 83/16 |
| 3,255,561 A * | 6/1966 | Cable | ................ | E04F 13/06 52/717.06 |
| 3,301,741 A * | 1/1967 | Danielson | ................ | C09J 7/21 156/247 |
| 3,643,393 A * | 2/1972 | Pierce | ................ | E04B 2/80 52/287.1 |
| 3,736,685 A * | 6/1973 | Shibata | ................ | B42F 5/00 40/772 |
| 3,741,786 A * | 6/1973 | Torrey | ................ | C09J 7/20 156/719 |
| 4,397,905 A * | 8/1983 | Dettmer | ................ | C09J 7/22 428/161 |
| 4,460,634 A * | 7/1984 | Hasegawa | ................ | G09F 15/02 156/289 |
| 4,553,363 A * | 11/1985 | Weinar | ................ | E04F 19/06 52/718.04 |
| 4,781,957 A * | 11/1988 | Brown | ................ | C09J 7/243 428/167 |
| 4,833,855 A * | 5/1989 | Winter, IV | ................ | E04C 2/288 52/591.4 |
| 4,835,925 A * | 6/1989 | Hoffmann, Sr. | ................ | E04F 13/06 52/287.1 |
| 4,876,837 A * | 10/1989 | Kelly | ................ | B21B 1/095 52/287.1 |
| 4,977,718 A * | 12/1990 | Hoffman, Sr. | ................ | E04F 19/028 52/287.1 |
| 5,045,374 A * | 9/1991 | Tucker | ................ | E04F 19/028 428/192 |
| 5,138,810 A * | 8/1992 | Kartler | ................ | E04F 13/06 52/255 |
| 5,141,790 A * | 8/1992 | Calhoun | ................ | B05B 12/24 428/354 |
| 5,246,775 A * | 9/1993 | Loscuito | ................ | C09J 7/21 428/41.5 |
| 5,296,277 A * | 3/1994 | Wilson | ................ | C09J 7/38 428/161 |
| 5,344,681 A * | 9/1994 | Calhoun | ................ | C09J 7/20 428/354 |
| 5,344,693 A * | 9/1994 | Sanders | ................ | C09J 7/20 428/167 |
| 5,442,886 A * | 8/1995 | Iacobelli | ................ | E04F 13/06 52/287.1 |
| 5,486,394 A * | 1/1996 | Stough | ................ | B32B 7/12 428/110 |
| 5,589,246 A * | 12/1996 | Calhoun | ................ | C09J 7/35 428/167 |
| 5,650,215 A * | 7/1997 | Mazurek | ................ | C09J 7/38 428/156 |
| 5,662,758 A * | 9/1997 | Hamilton | ................ | C09J 7/22 156/221 |
| 5,687,523 A * | 11/1997 | Stough | ................ | E04F 13/042 428/110 |
| 5,711,124 A * | 1/1998 | Stough | ................ | E04F 13/042 428/354 |
| 5,752,353 A * | 5/1998 | Koenig | ................ | E04F 13/06 52/287.1 |
| 5,778,617 A * | 7/1998 | Free | ................ | E04F 13/06 52/255 |
| 5,795,636 A * | 8/1998 | Keller | ................ | C09J 7/38 428/40.1 |
| 5,836,122 A * | 11/1998 | Rennich | ................ | E04F 13/06 52/287.1 |
| 6,001,200 A * | 12/1999 | Hibler | ................ | E04F 13/042 156/212 |
| 6,015,606 A * | 1/2000 | Abe | ................ | C09J 7/38 428/354 |
| 6,045,858 A * | 4/2000 | Hamano | ................ | C09J 7/22 427/208.4 |
| 6,073,406 A * | 6/2000 | Kearney | ................ | E04F 13/06 52/287.1 |
| 6,145,259 A * | 11/2000 | Koenig, Jr. | ................ | E04F 13/06 52/287.1 |
| 6,217,981 B1 * | 4/2001 | Kanno | ................ | C09J 7/38 156/283 |
| 6,221,484 B1 * | 4/2001 | Leiter | ................ | B32B 3/266 428/40.1 |
| 6,228,485 B1 * | 5/2001 | Leiter | ................ | B32B 3/266 428/40.1 |
| D458,388 S * | 6/2002 | Harel | ................ | D25/119 |
| 6,447,872 B1 * | 9/2002 | Larson | ................ | E04F 13/06 52/287.1 |
| 6,502,358 B2 * | 1/2003 | Smythe, Jr. | ................ | E04F 13/068 52/287.1 |
| 6,539,680 B2 * | 4/2003 | Kunz | ................ | E04F 13/068 52/287.1 |
| 6,541,098 B2 * | 4/2003 | Venkatasanthanam | ... | B32B 3/28 428/161 |
| 6,565,697 B1 * | 5/2003 | Maercklein | ................ | C09J 7/38 156/275.5 |
| 6,571,520 B2 * | 6/2003 | Koenig, Jr. | ................ | E04F 13/06 52/287.1 |
| 6,602,580 B1 * | 8/2003 | Hamilton | ................ | B65D 65/14 428/137 |
| 6,684,586 B1 * | 2/2004 | Hoffmann, Sr. | ................ | E04F 13/042 52/287.1 |
| 6,691,476 B1 * | 2/2004 | Kunz | ................ | E04F 13/06 52/287.1 |
| 6,722,092 B2 * | 4/2004 | Kunz | ................ | E04F 13/06 52/255 |
| 6,758,017 B2 * | 7/2004 | Young | ................ | E04F 19/022 52/287.1 |
| 6,901,711 B2 * | 6/2005 | Fay | ................ | E04B 1/78 52/407.3 |
| 7,097,892 B2 * | 8/2006 | Sano | ................ | C09J 7/38 428/40.1 |
| 7,214,434 B2 * | 5/2007 | Dalgleish | ................ | E04F 13/042 162/164.1 |
| 7,673,428 B1 * | 3/2010 | Smythe | ................ | E04F 13/06 52/287.1 |
| 7,713,606 B2 * | 5/2010 | Kasahara | ................ | B65H 37/007 428/41.5 |
| 8,701,365 B2 * | 4/2014 | Rosenthal | ................ | E04F 13/06 52/287.1 |
| 8,910,437 B2 * | 12/2014 | Robertson | ................ | E04F 13/06 52/255 |
| 9,085,906 B2 * | 7/2015 | Ward | ................ | E04F 13/068 |
| 9,303,413 B2 * | 4/2016 | Koenig, Jr. | ................ | E04F 19/022 |
| 9,377,160 B1 * | 6/2016 | Smythe | ................ | E04F 13/06 |
| 9,388,582 B1 * | 7/2016 | Smythe | ................ | E04F 13/068 |
| 9,446,546 B1 * | 9/2016 | Wambaugh | ................ | E04F 13/068 |
| 10,047,524 B2 * | 8/2018 | Smythe | ................ | E04F 13/06 |
| 10,100,528 B2 * | 10/2018 | Wambaugh | ................ | B29C 48/00 |
| 10,258,122 B2 * | 4/2019 | Bongiorno | ................ | A45C 5/005 |
| 10,458,122 B2 * | 10/2019 | Bodner | ................ | E04F 19/064 |
| 11,808,047 B2 * | 11/2023 | Cline | ................ | E04F 13/042 |
| 11,976,475 B2 * | 5/2024 | House | ................ | E04F 21/0053 |
| 2002/0035809 A1 * | 3/2002 | Smythe, Jr. | ................ | E04F 13/06 52/255 |
| 2002/0073638 A1 * | 6/2002 | Kunz | ................ | E04F 13/068 52/255 |

(56) References Cited

U.S. PATENT DOCUMENTS

| | | | |
|---|---|---|---|
| 2002/0073639 A1* | 6/2002 | Kunz | E04F 13/06 52/255 |
| 2002/0189747 A1* | 12/2002 | Steinwender | E04F 15/04 156/304.1 |
| 2003/0033766 A1* | 2/2003 | Smythe, Jr. | E04F 19/022 52/255 |
| 2003/0033770 A1* | 2/2003 | Harel | E04F 13/068 52/287.1 |
| 2003/0056453 A1* | 3/2003 | Young | E04F 19/022 52/287.1 |
| 2003/0110721 A1* | 6/2003 | Harel | B32B 27/10 52/287.1 |
| 2003/0131546 A1* | 7/2003 | Kunz | E04F 13/068 52/255 |
| 2003/0181114 A1* | 9/2003 | Newton | E04F 13/042 428/40.1 |
| 2004/0255537 A1* | 12/2004 | Dalgleish | E04F 13/06 52/506.01 |
| 2006/0070324 A1* | 4/2006 | Daly, IV | E04F 13/06 52/287.1 |
| 2006/0191237 A1* | 8/2006 | Hansen | E04F 13/04 52/746.1 |
| 2006/0283115 A1* | 12/2006 | Robertson | B29C 66/304 52/364 |
| 2007/0122593 A1* | 5/2007 | Conboy | E04F 13/042 428/167 |
| 2008/0163584 A1* | 7/2008 | Colucci | E04F 13/042 428/487 |
| 2009/0022924 A1* | 1/2009 | Griffin | B29C 65/4825 156/60 |
| 2010/0092730 A1* | 4/2010 | Tomino | C09J 7/22 428/161 |
| 2010/0209671 A1* | 8/2010 | Kato | C09J 7/38 428/167 |
| 2010/0215900 A1* | 8/2010 | Conboy | C09J 7/21 428/137 |
| 2010/0218445 A1* | 9/2010 | Smythe | E04F 13/06 52/255 |
| 2010/0291351 A1* | 11/2010 | Conboy | C09J 7/35 428/177 |
| 2011/0023392 A1* | 2/2011 | Rosenthal | E04F 13/068 52/287.1 |
| 2011/0289873 A1* | 12/2011 | Smythe, Jr. | E04F 13/02 52/255 |
| 2012/0324812 A1* | 12/2012 | Robertson | B26F 1/384 52/287.1 |
| 2013/0045351 A1* | 2/2013 | Spanton | E04F 13/042 428/61 |
| 2013/0145706 A1* | 6/2013 | Norton | A61B 5/4809 52/287.1 |
| 2013/0186024 A1* | 7/2013 | Rosentiel | E04F 13/06 52/255 |
| 2014/0260019 A1* | 9/2014 | Conboy | E04F 13/06 264/134 |
| 2015/0068142 A1* | 3/2015 | Smythe, Jr. | E04F 13/06 52/287.1 |
| 2015/0075093 A1* | 3/2015 | Grant | E04F 13/22 52/255 |
| 2015/0259929 A1* | 9/2015 | Koenig, Jr. | E04F 19/022 52/287.1 |
| 2016/0186019 A1* | 6/2016 | Negri | C04B 26/18 52/745.09 |
| 2016/0289974 A1* | 10/2016 | Smythe | E04F 19/028 |
| 2016/0362896 A1* | 12/2016 | Wambaugh | E04F 13/068 |
| 2017/0066946 A1* | 3/2017 | Moyer, Jr. | C08L 31/04 |
| 2017/0081562 A1* | 3/2017 | Rosenthal | C09J 7/38 |
| 2017/0138058 A1* | 5/2017 | Swartz | E04F 13/042 |
| 2017/0314274 A1* | 11/2017 | Rosenthal | E04F 13/24 |
| 2017/0314275 A1* | 11/2017 | Rosenthal | C09J 5/06 |
| 2017/0335569 A1* | 11/2017 | Kruger | E04F 13/047 |
| 2018/0171646 A1* | 6/2018 | Stahl | E04F 19/061 |
| 2020/0010733 A1* | 1/2020 | Hulteen | E04B 1/948 |
| 2021/0079273 A1* | 3/2021 | Kamath | C09J 7/30 |
| 2021/0140179 A1* | 5/2021 | House | E04F 21/0053 |
| 2021/0198903 A1* | 7/2021 | Cline | E04F 13/06 |
| 2022/0412098 A1* | 12/2022 | Radford | E04F 13/045 |
| 2023/0052281 A1* | 2/2023 | Cline | C09J 7/20 |

FOREIGN PATENT DOCUMENTS

| | | |
|---|---|---|
| JP | 2007154614 A | 6/2007 |
| WO | 2020092727 A1 | 5/2020 |

\* cited by examiner

PRESSURE SENSITIVE ADHESIVE BUILDING SURFACE ACCESSORY

CROSS-REFERENCE TO RELATED APPLICATIONS

This application claims the benefit of priority of U.S. Provisional Patent Applications Nos. 63/352,079, filed Jun. 14, 2022, and 63/233,007, filed Aug. 13, 2021, each of which is hereby incorporated herein by reference in its entirety.

BACKGROUND OF THE DISCLOSURE

1. Field of the Disclosure

The present disclosure relates generally to building surface accessories, specifically, trim, molding, and joint supports with adhesive.

2. Technical Background

Building surface panels, such as drywall panels, are commonly used to create walls, ceilings, and other building surfaces in homes, businesses and other buildings. The panels are typically attached to a frame that holds the panels in place. Building surface accessories are often added to the surface panels to improve the effectiveness and/or appearance of the surface. Example surface accessories include trim or molding, such as baseboard, crown molding, door/window trim, chair molding, picture molding, etc. and joint supports, such as corner beads or arch supports.

Often, the edges between the panels are covered in order to create a smooth surface from one panel to the next. For example, in many instances, the joints or seams between adjacent panels are covered with a joint compound that is shaped to form a flat surface or clean corner at the joint. To strengthen the joint, the neighboring panels can be secured with a joint support, such as joint tape or a corner bead. The joint support aids in both securing the surface between the two panels, and in providing the desired shape at the seam.

Typical methods of installing a joint support include applying a preliminary layer of joint compound and fastening the joint support to the preliminary layer of joint compound. However, this method requires waiting for the first layer of joint compound to dry before moving on to subsequent steps. In some cases, the builder must wait up to 24 hours or longer before advancing to a subsequent step in the construction process. Other methods of installing joint supports use mechanical fasteners to attach the joint support to the building surface panels. For example, conventional metal corner beads are often attached to building surface panels using screws. This process is time consuming and requires the use of a specific tool. Moreover, it can require specific expertise to adequately obscure the mechanical fasteners after the building surface is completed.

Other types of surface accessories, such as trim and molding, are often installed either through the use of nails inserted in through the outside surface of the trim or through the use of a drying adhesive applied to the back surface. The use of nails can affect the appearance of the trim or molding by damaging the visible outer surface. The use of drying adhesives can quickly dry before the trim is correctly oriented.

Accordingly, the present inventors have determined that a building surface accessory that can be installed more easily and efficiently would be attractive to builders and customers.

SUMMARY OF THE DISCLOSURE

The present disclosure relates generally to building surface accessories, for example, suitable for covering a seam between two building surface panels.

In one aspect, the present disclosure provides a building surface accessory comprising:
 an elongated body having a length that extends from a first end to a second end, the elongated body having an inside surface, an outside surface, a first edge, and a second edge; and
 an adhesive sheet having an outside surface coupled to the elongated body, an inside surface, and pressure sensitive adhesive on at least a portion of the inside surface, wherein the adhesive sheet is embossed such that the pressure sensitive adhesive has a plurality of raised portions.

In another aspect, the disclosure provides a building surface construction using a building surface accessory, the building surface construction comprising:
 a building surface accessory including:
  an elongated body having a length that extends from a first end to a second end, the elongated body comprising:
   first and second elongate flanges, each of the first and second elongate flanges extending from the first end to the second end and having an inside surface, an outside surface, an inner edge, and an outer edge,
  an embossed pressure-sensitive adhesive sheet disposed on at least a first portion of an inside surface of the first elongate flange;
 a first building surface panel;
 a second building surface panel adjacent to the first building surface panel so as to form a seam between the first building surface panel and the second building surface panel; and
 the building surface accessory disposed over the first building surface panel and the second building surface panel and covering at least a portion of the seam, wherein the pressure-sensitive adhesive sheet secures the building surface accessory to the first building surface panels.

In another aspect, the disclosure provides a method of installing a building surface accessory, the method comprising:
 placing a building surface accessory over a first building surface panel and a second building surface panel so as to cover at least a portion of a seam between the first and second building surface panels, the building surface accessory comprising:
  an elongated body having a length that extends from a first end to a second end, the elongated body comprising:
   first and second elongate flanges, each of the first and second elongate flanges extending from the first end to the second end and having an inside surface, an outside surface, an inner edge, and an outer edge,
  an embossed pressure-sensitive adhesive sheet disposed on at least a first portion of an inside surface of the first elongate flange, the embossed pressure-sensitive adhesive sheet having a plurality of raised portions,
 applying a first pressure to the building surface accessory in order to secure the building surface accessory to the first building surface panel using the embossed pressure-sensitive adhesive sheet by a first adhesion strength; and applying a second pressure greater than the first pressure to the building surface accessory in order to deform the raised portions of the embossed pressure-sensitive adhesive sheet and thereby secure the building surface accessory to the first building surface panel by a second adhesion strength greater than the first adhesion strength.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

As described above, the present inventors have noted that conventional building surface accessories, such as corner beads, are time consuming to install. The present inventors have determined that a building surface accessory that can be installed quickly and without the need for a preliminary layer of joint compound, drying adhesive, or mechanical fasteners would be attractive to builders.

Accordingly, one aspect of the disclosure is a building surface accessory including an elongated body and an adhesive sheet. The elongated body has a length that extends from a first end to a second end. The elongated body includes at least a first edge and second edge extending along the length of the elongated body. The elongated body further includes an inside surface and an outside surface substantially opposite the inside surface.

The adhesive sheet has a first surface coupled to the elongated body and a second surface substantially opposite the first surface. At least a portion of the second surface is covered with pressure-sensitive adhesive. The adhesive sheet is embossed such that the second surface, and the pressure-sensitive adhesive thereon, has a plurality of raised portions.

Figure 1A:
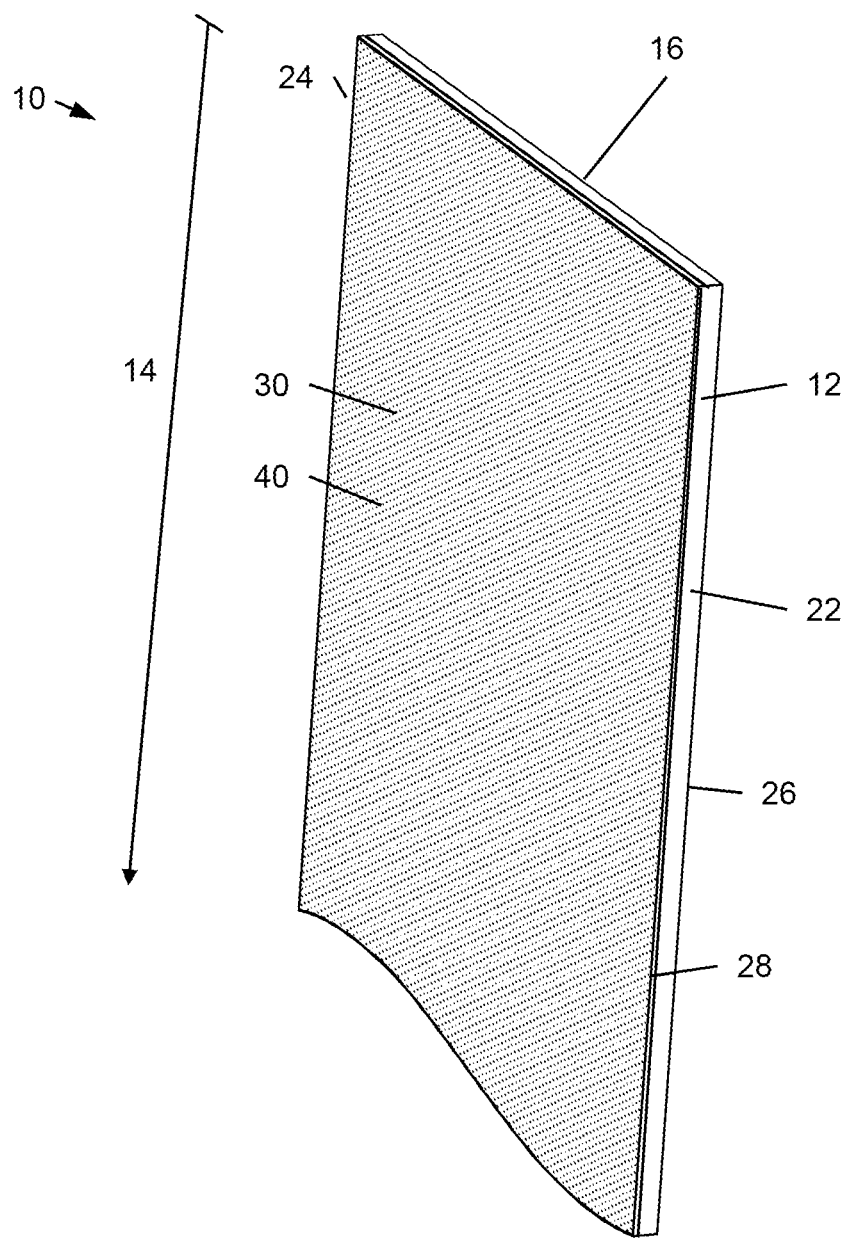
FIG. 1A is a schematic perspective view of a building surface accessory according to an embodiment of the disclosure.
Figure 1B:
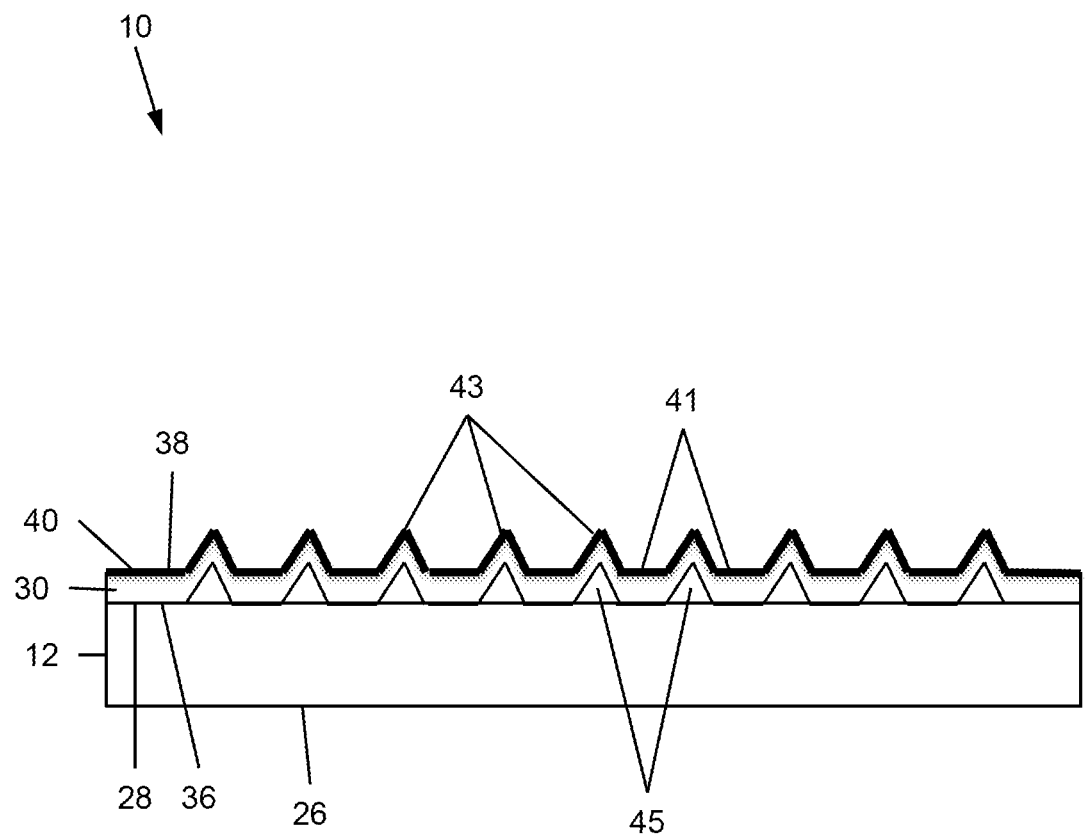
FIG. 1B is an end cross-sectional view of the building surface accessory of FIG. 1A.

Such a building surface accessory is shown in FIGS. 1A and 1B. As shown in FIG. 1A, building surface accessory 10 includes an elongated body 12 that has length 14, first end 16 and second end (not shown). Length 14 is the largest dimension of elongated body 12 and is substantially greater than the width or breadth of elongated body 12. Further, first end 16 and second end are defined with respect to length 14, as the length 14 is the distance between the first end 16 and the second end. The elongated body 12 has a first edge 22, a second edge 24, an outside surface 26, and an inside surface 28. Notably, the inside surface 28 is the element of the building surface accessory 10 that faces towards a building surface whereas outside surface 26 is the element of the building surface accessory 10 that faces away from a building surface (e.g., face the interior of a room).

The adhesive sheet 30 has an outside surface 36 and an inside surface 38. The outside surface 36 is coupled to the elongated body 12. The adhesive sheet 30 further includes a pressure-sensitive adhesive 40 covering at least a portion of the inside surface 38. Notably, the inside surface 38 is the element of the adhesive sheet 30 that faces towards a building surface whereas outside surface 36 is the element of the adhesive sheet 30 that faces away from a building surface (e.g., face the interior of a room).

The adhesive sheet 30 is embossed. As shown in FIG. 1B, the embossing pattern includes a plurality of raised portions 43 extending outward from the inside surface 36. There are corresponding cavities or valleys 45 in the outside surface 36 positioned opposite the raised portions 43. The raised portions 43 are scaled up in size in FIG. 1B for visibility. It is understood that in application, the raised portions 43 may be smaller relative to the size of the building surface accessory 10.

In the shown embodiments, the raised portions 43 are conical, frusto-conical, or hemispherical in shape having a substantially round cross-section. However, it is understood that other shapes of raised portions 43 and lower portions 41 can be used. In some examples, the raised portions 43 are elongated ridges. In some forms, the elongated ridges extend substantially the entire length or width of the adhesive sheet 30. In alternative forms, the elongated ridges extend less than half of the length or width of the adhesive sheet 30. In other forms, the raised portions are pyramid shaped, circular or cylindrical in shape, annular or donut shaped, or have an ornamental shape, such as a company logo, letters, numbers, or symbols.

The surface of the pressure-sensitive adhesive 40 includes substantially planar lower portions 41 extending between the raised portions 43. The surface area of the lower portions 41 is greater than the surface area of the raised portions 43. In some examples, the raised portions 43 cover less than 25% of the two-dimensional surface area of the inside surface 38. In some forms, the raised portions 43 cover less than 10% of the two-dimensional surface area of the inside surface 38. In some examples, the adhesive sheet 30 includes a second, stronger adhesive covering at least a portion of the lower portions 41.

In some forms, the pressure-sensitive adhesive 40 is covered with a removable release liner. Prior to installation, the release liner is removed, exposing the pressure-sensitive adhesive such that it can be adhered to the building surface.

In some examples, a substantially flat adhesive sheet is passed through an embossing machine to produce the embossing pattern. The embossing machine presses elongated members, such as needles, into the outside surface 36, deforming the adhesive sheet as shown. In some forms, the embossing pattern is a repeating pattern.

In some examples, the embossing machine comprises a pair of rollers between which the adhesive sheet is passed. A first roller includes one or more protrusions shaped to form the raised portions of the adhesive sheet. The second roller includes one or more recesses positioned to receive the protrusions of the first roller. In one example, the first roller has a plurality of protrusions having a circular cross-section. The second roller includes a plurality of annular grooves wherein each annular groove aligns with a row of protrusions on the first roller. During operation, the protrusions push portions of the adhesive sheet into the annular grooves, thereby deforming the adhesive sheet to have raised portions.

In operation, the building surface accessory 10 is pressed into contact with a building surface, such as the exposed surface one or more drywall panels. The building surface accessory 10 is oriented such that the inside surfaces 28/38 face the building surface. Initially, the building surface accessory 10 is pressed into contact with the building surface with a first pressure. The first pressure is insufficient to fully compress the raised portions 43. Accordingly, the raised portions 43 contact the building surface and adhere thereto. However, the lower portions 41 are spaced from the building surface and thus do not adhere thereto. The adhesion strength of the raised portions 43 to the building surface can be overcome by an installer to remove and reposition the building surface accessory 10 relative to the building surface.

Once the building surface accessory 10 is properly positioned relative to the building surface, the building surface accessory 10 is pressed into contact with building surface with a second pressure. The second pressure is greater than the first pressure. The second pressure is sufficient to further deform the raised portions 43 such that the lower portions 41 contact the building surface and increasing the effective area of surface contact of the pressure sensitive adhesive with the building surface. Contact between the lower portions 41 and the building surface increases the adhesion between the building surface accessory 10 and the building surface, so as to better secure the building surface accessory 10 thereto.

The valleys 45 provide space for the raised portions 43 to deform into when the second pressure is applied. The raised portions 43 of the adhesive sheet are pushed into the cavities so as to become substantially co-planar with the lower portions 41. In some examples, the adhesive sheet 30 is air permeable so as to allow air within the valleys 45 to escape as the raised portions 43 are deformed. In some forms, the embossing process punctures the adhesive sheet within each raised portion 43, making the adhesive sheet 30 air permeable. In some forms, the elongated body 12 is air permeable, either through perforations or by being formed of an air permeable material, to further allow for drying of the joint compound.

In some operations, a tool is used to apply the second force. For example, a roller, trowel, hawk, squeegee, or other tool is run along the length of the building surface accessory 10 to press the building surface accessory 10 towards the building surface.

In some applications, the adhesion strength of the fully compressed pressure-sensitive adhesive 40 is sufficient to permanently install the building surface accessory 10. In alternative applications, an additional fastening method is used after the second pressure is applied. In some examples, such as those shown in FIGS. 2A-13 below, a joint compound is applied over at least a portion of the outside surface 26 and/or the outside surface 36.

The building surface accessory 10 shown is a simplified rectangular prism. It is understood that it can have other shapes. In some examples, the outside surface 26 has a molded or otherwise decorative shape for use in trim applications. In other examples, such as those shown below, the building surface accessory 10 is thinner and/or tapered in some portions so as to have a lower profile. The lower profile building surface accessory 10 can be used as a joint support member and then covered with a coating, such as joint compound.

The building surface accessory 10 is shaped to conform to the building surface. The example shown has a substantially planar inner surface 26 for application to flat building surfaces. Other examples are substantially L-shaped or V-shaped, as shown below, for attachment to a corner building surface. Alterative examples are curved for attachment to arches. In still further examples, at least a portion of the building surface accessory 10 is deformable or bendable such that the building surface accessory 10 can be shaped to conform to the shape of the building surface.

As discussed above, one aspect of the disclosure is a joint support including an elongated body, a first auxiliary flap, a facing sheet, and one or more adhesive sheets having a pressure-sensitive adhesive substance. The elongated body has a length that extends from a first end to a second end. The elongated body includes first and second elongate flanges. Each of the first and second elongate flanges extends from the first end to the second end and has an inside surface, an outside surface, an inner edge, and an outer edge. The first auxiliary flap includes an inner portion attached to the inside surface of the first elongate flange and an outer portion that extends laterally beyond the outer edge of the first elongate flange. The facing sheet is disposed on the outside surface of the first elongate flange and the outside surface of the second elongate flange. The adhesive sheet is disposed on at least a first portion of an inside surface of the first auxiliary flap.

Figure 2A:
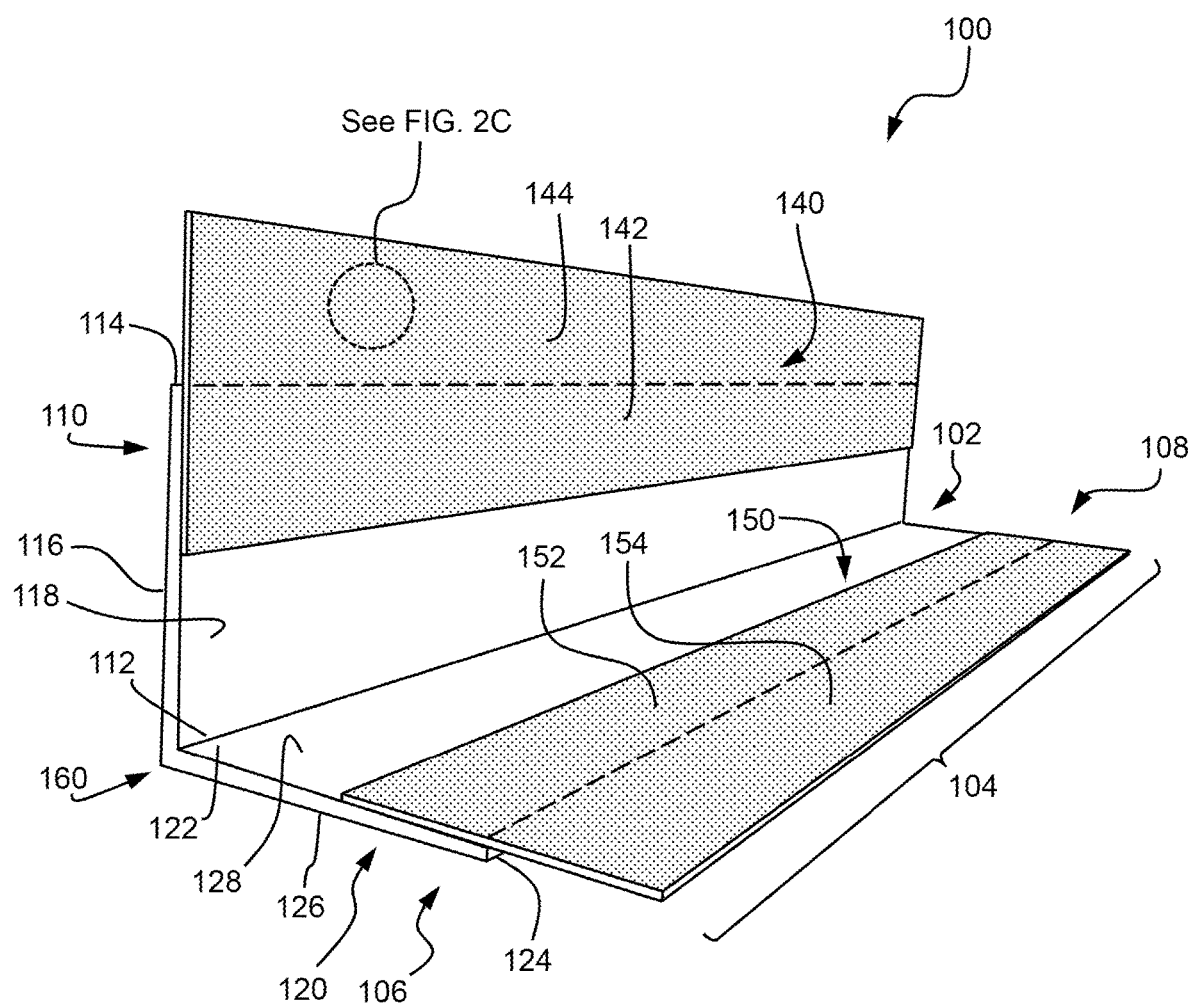
FIG. 2A is a schematic perspective view of a building surface accessory or joint support according to an embodiment of the disclosure.
Figure 2B:
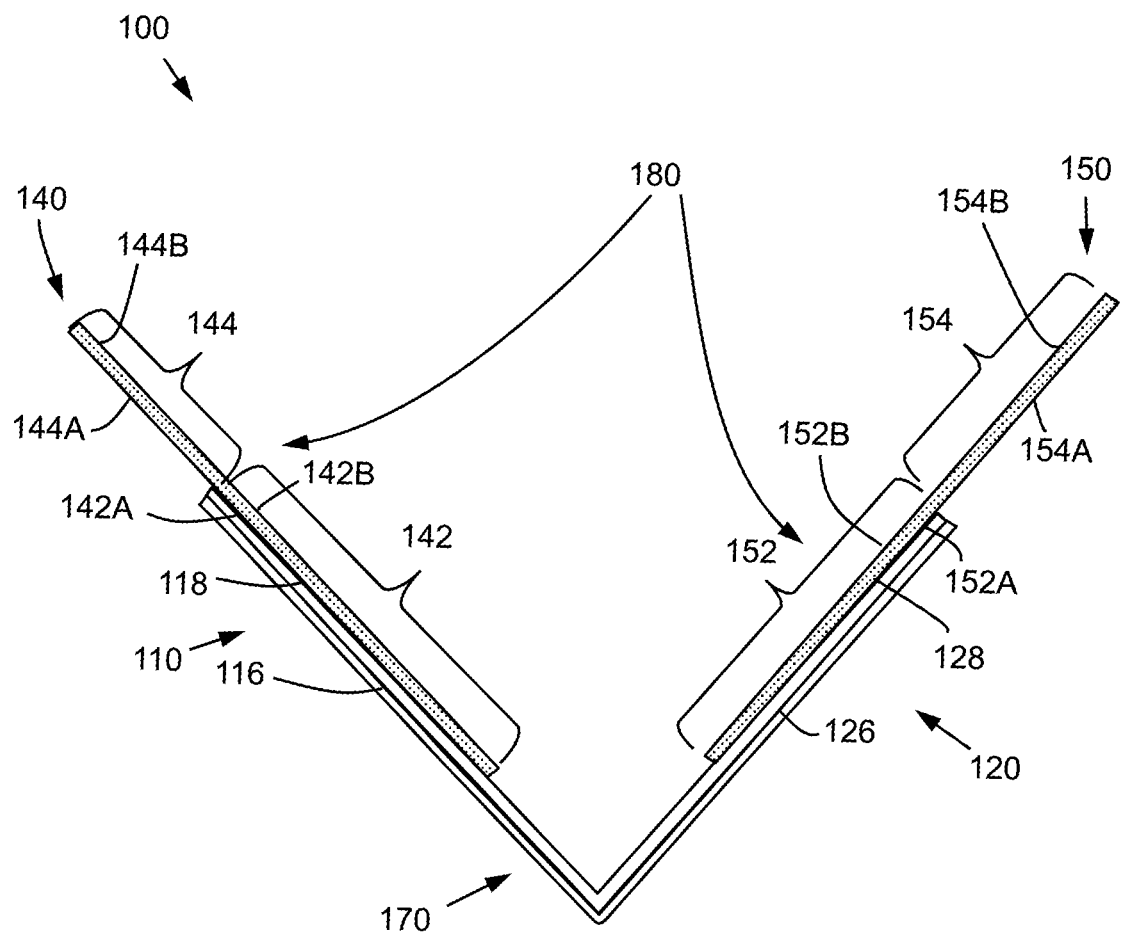
FIG. 2B is a schematic end view of the building surface accessory or joint support of FIG. 2A.
Figure 2C:
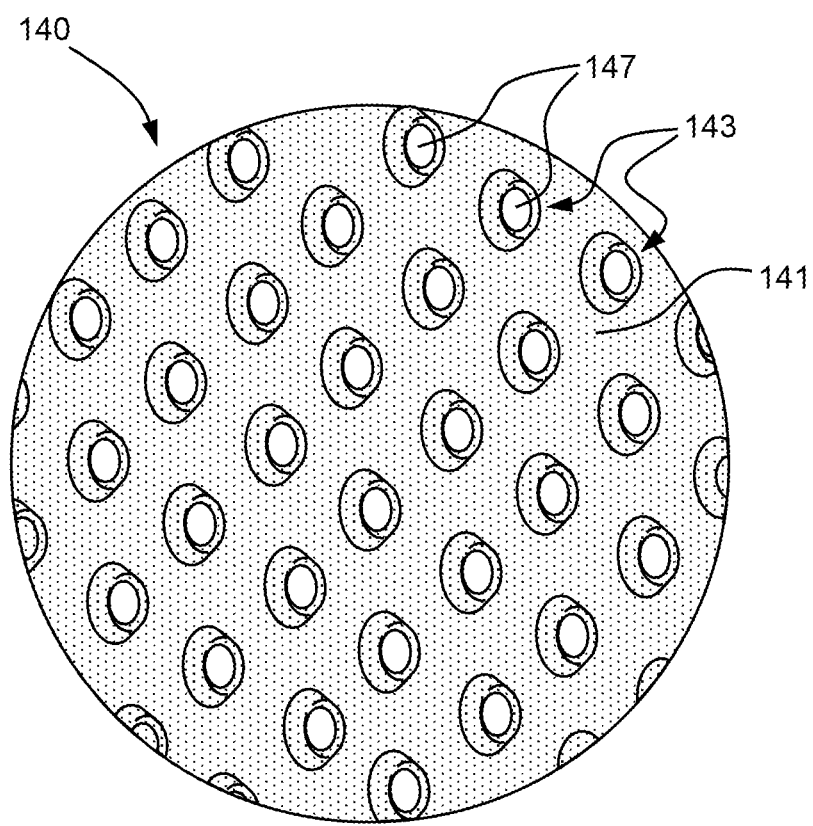
FIG. 2C is a detailed view of an embossed pattern on the building surface accessory or joint support of FIG. 2A.

Such a joint support building surface accessory is shown in perspective view in FIGS. 2A-2C. As shown in FIG. 2A, the building surface accessory or joint support 100 includes elongated body 102 that has a length 104, first end 106, and second end 108. Elongated body 102 includes a first elongated flange 110 and second elongated flange 120 connected at an angle. Length 104 is the largest dimension of elongated body 102 and is substantially greater (e.g., at least 10 times greater) than the width or breadth of elongated body 102. For example, in one embodiment the elongated body 102 has a length of 3 feet, 4 feet, 6 feet, 8 feet, 12 feet or greater and the flanges 110, 120 have a width of between 1 inch and 4 inches. In some embodiments, the first elongated flange 110 and the second elongated flange 120 have equal widths. In other forms, the width of the second elongate flange 120 differs from the width of the first elongate flange 110. Further, first end 106 and second end 108 are defined with respect to length 104.

First elongated flange 110 has inner edge 112, outer edge 114, outside surface 116, and inside surface 118. Similarly, second elongate flange 120 has inner edge 122, outer edge 124, outside surface 126, and inside surface 128. The inside surface 118 and 128 form the inside surface of the elongated body 102. Similarly, the outside surfaces 116 and 126 form the outside surface of the elongated body 102. Notably, inside surface 118 and inside surface 128 are elements of joint support 100 that face towards a building surface whereas outside surface 116 and outside surface 126 are elements of joint support 100 that face away from a building surface (e.g., face the interior of a room). Furthermore, inner edge 112 and inner edge 122 are elements of joint support 100 that are proximate to a center of joint support 100 whereas outer edge 114 and outer edge 124 are elements of joint support 100 that are at distal areas of joint support 100.

Joint support 100 also includes first auxiliary flap 140 and second auxiliary flap 150. First auxiliary flap 140 includes inner portion 142 and outer portion 144. The demarcation between inner portion 142 and outer portion 144 is conceptually illustrated by the dashed line on first auxiliary flap 140. Inner portion 142 of first auxiliary flap 140 is attached to inside surface 118 of first elongate flange 110 whereas outer portion 144 of first auxiliary flap 140 extends laterally beyond outer edge 114 of first elongate flange 110. Similarly, second auxiliary flap 150 includes inner portion 152 and outer portion 154. The demarcation between inner portion 152 and outer portion 154 is conceptually illustrated by the dashed line on second auxiliary flap 150. Inner portion 152 of second auxiliary flap 150 is attached to inside surface 128 of second elongate flange 120 whereas outer portion 154 of second auxiliary flap 150 extends laterally beyond outer edge 124 of second elongate flange 120.

As shown in the schematic end view of joint support 100 provided in FIG. 2B, inner portion 142 of first auxiliary flap 140 includes outside surface 142A and inside surface 142B while outer portion 144 of first auxiliary flap 140 includes outside surface 144A and inside surface 144B. Outside surface 142A of first auxiliary flap 140 is attached to inside surface 118 of first elongate flange 110. Likewise, inner portion 152 of second auxiliary flap 150 includes outside surface 152A and inside surface 152B. Further, outer portion 154 of second auxiliary flap 150 includes outside surface 154A and inside surface 154B. Outside surface 152A of second auxiliary flap 150 is attached to inside surface 128 of second elongate flange 120. Notably, upon installation of joint support 100 over a building surface, inside surface 142B, inside surface 144B, inside surface 152B, and inside surface 154B will each face towards a building surface. On the other hand, outside surface 142A, outside surface 144A, outside surface 152A, and outside surface 154A will each face away from the building surface upon installation and will be exposed (e.g., to face the interior of a room). Accordingly, as explained in more detail below, the outside surfaces may be configured to receive a covering layer of joint compound or tape.

Additionally, facing sheet 170 is attached to outside surface 116 of first elongate flange 110 and outside surface 126 of second elongate flange 120. Such a facing sheet can provide a smooth transition from the joint support to the building surface panel so as to minimize the visibility of the edge of the joint support. Moreover, the facing sheet can also enhance adhesion of a joint compound to the joint support.

First auxiliary flap 140 and second auxiliary flap 150 of joint support 100 are each configured as embossed pressure-sensitive adhesive sheets similar to the adhesive sheet 30 described above. A detailed view of the embossed shape of first auxiliary flap 140 is shown in FIG. 2C. The pressure-sensitive adhesive sheet of first auxiliary flap 140 is embossed such that it has a plurality of annular raised sections 143 extending inward from lower portions 141. In use, the raised portions 143 extend towards the building surface. There are corresponding valleys behind the pressure-sensitive adhesive sheet of auxiliary flaps 140 and 150 allowing the raised portions 143 to deform to be substantially coplanar with the lower portions 141 as described above. Accordingly, as described with respect to the building surface accessory 10, the joint support 100 can be removably adhered to the building surface by pressing with a first pressure, and more aggressively adhered to the building surface by pressing with a second, higher pressure.

In some examples, the more aggressive adhesion achieved by the second pressure forms a permanent bond between the joint support 100 and the building surface. In some forms, a permanent bond means that the removal of the joint support will result in damage of the building surface on which the joint support is placed. In other examples, a permanent bond means that removal of the joint support from the building surface results in loss of the pressure sensitive adhesive substance from the joint support, as the pressure sensitive adhesive substance is left on the building surface as the joint support is removed.

In certain embodiments of the building surface accessory as otherwise described herein, the adhesive sheet includes apertures extending therethrough. For example, as shown in FIG. 2C, the auxiliary flap 140 of building surface product 100 (FIG. 2A), includes apertures 147 extending therethrough. The apertures 147 allow material, such as joint compound, to extend through the auxiliary flap 140. Accordingly, the joint compound may provide a more integral attachment of the building surface accessory to a building surface by forming a connection with the building surface through each, or at least some, of the apertures.

In some embodiments, the apertures are surrounded by the raised portions of the embossed pattern. For example, as shown in FIG. 2C, each of the raised portions 143 of first auxiliary flap 140 has an annular shape that surrounds a respective aperture 147 in the adhesive sheet. In other embodiments, the apertures are formed in the lower portion of the adhesive sheet, rather than the raised portions. Further, in some embodiments, the apertures are formed in both the raised portions and the lower portions. Further still, in some embodiments, the apertures and raised portions are formed independently. For example, in some embodiments, the apertures have a first pattern and the raised portions have a second pattern with different dimensions than the first pattern, such that at least some of the apertures overlap with the raised portions.

In some embodiments, the apertures have a width of at least 1/16 inch, e.g., at least 1/8 inch. Further, in some embodiments, the apertures have a width of no more than 1/2 inch, e.g., no more than 1/4 inch. For example, in some embodiments, the apertures are round and have a diameter of in a range from 1/16 to 1/2 inch, e.g., from 1/8 inch to 1/4 inch. Alternatively, in some embodiments, the apertures have a width that is smaller than 1/16 inch. Further still, in some embodiments, the adhesive sheet does not include apertures.

In certain embodiments of the joint support as otherwise described herein, the joint support includes a second auxiliary flap including an inner portion attached to the inside surface of the second elongate flange and an outer portion that extends laterally beyond the outer edge of the second elongate flange, and the pressure-sensitive adhesive sheet is disposed on at least a portion of an inside surface of the second auxiliary flap.

Figure 3:
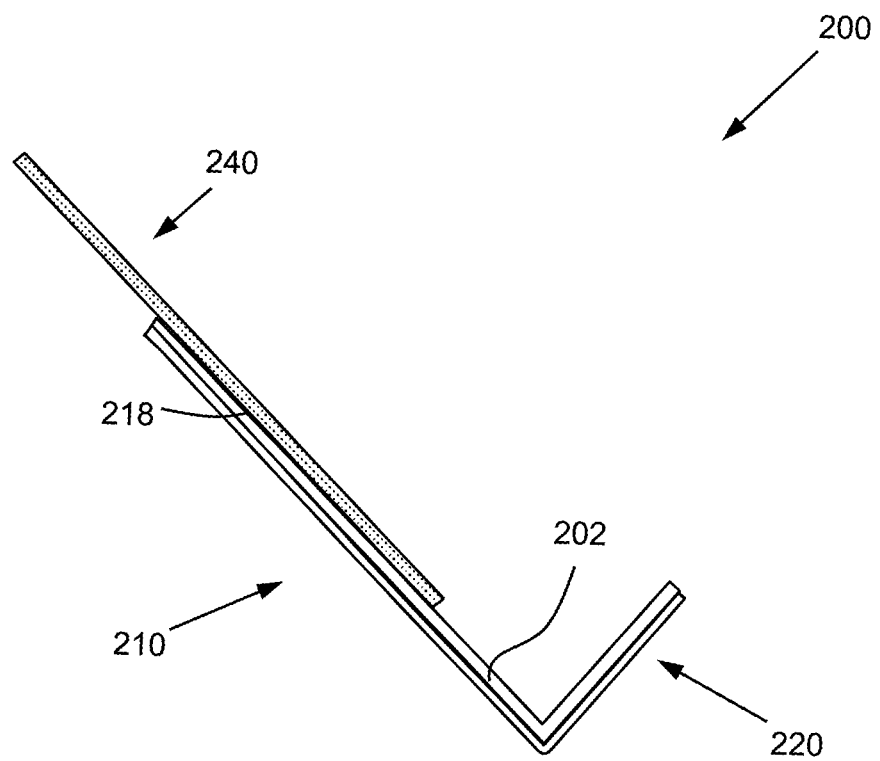
FIG. 3 is a schematic end view of a building surface accessory or joint support according to another embodiment of the disclosure.

For example, joint support 100 includes first auxiliary flap 140 attached to inside surface 118 of first elongate flange 110 and second auxiliary flap 150 attached to inside surface 128 of second elongate flange 120, as described above. In other embodiments, the joint support includes only a first auxiliary flap attached to the first elongate flange without a second auxiliary flap attached to the second elongate flange. Such an embodiment is shown in FIG. 3. Joint support 200 is in the form of L-Trim and includes a first elongate flange 210 and a second elongate flange 220. The second elongate flange 220 is substantially narrower than first elongate flange 210 such that the elongated body 202 has an asymmetrical configuration. For example, in some embodiments the first elongated flange has a width of between 1 inch and 4 inches and the second elongated flange 220 has a width of 1/4 inch, 3/8 inch, 1/2 inch, 3/4 inch, 1 inch, or 1 1/2 inches. A first auxiliary flap 240 is secured to the inside surface 218 of first elongate flange 210, but no auxiliary flap is secured to second elongate flange 220. First auxiliary flap 240 may include an embossed pressure-sensitive adhesive sheet, as described herein. In other embodiments, a first auxiliary flap is secured to the inside surface of the first elongate flange and extends beyond the outer edge of the first elongate flange while another layer is secured to the inside surface of the second elongate flange but does not extend beyond the outer edge of the second elongate flange.

In certain embodiments of the joint support as otherwise described herein, the elongated body includes a corner connecting the first elongate flange and the second elongate flange. For example, as shown in FIG. 2A, elongated body 102 of joint support 100 includes corner 160 connecting first elongate flange 110 and second elongate flange 120.

Figure 4:
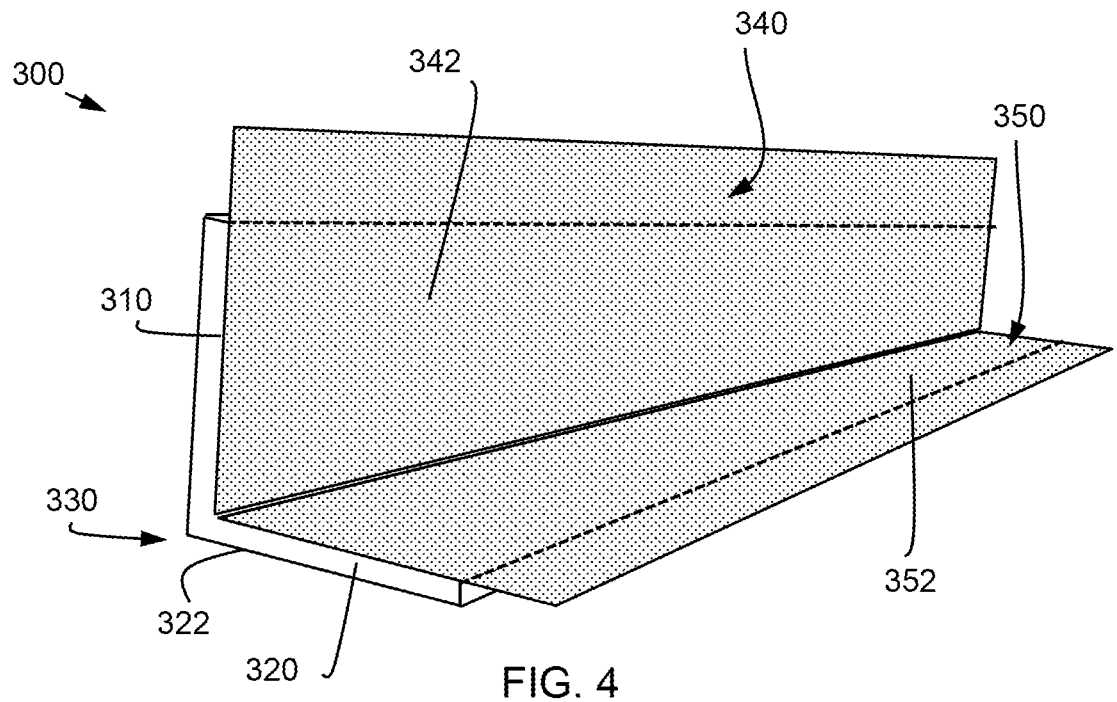
FIG. 4 is a schematic perspective view of a building surface accessory or joint support according to another embodiment of the disclosure.

In certain embodiments of the joint support as otherwise described herein, the inner portion of the first auxiliary flap and the inner portion of the second auxiliary flap connect at the corner. Such a joint support is shown in FIG. 4. Joint support 300 includes having a first elongate flange 310 and second elongate flange 320. First auxiliary flap 340 is attached to the inside surface of first elongate flange 310 and second auxiliary flap 350 is attached to the inside surface of second elongate flange 320. Each of first auxiliary flap 340 and second auxiliary flap 350 may include an embossed pressure-sensitive sheet. Facing sheet 322 is disposed on the outside surfaces of first elongate flange 310 and second elongate flange 320. Furthermore, inner portion 342 of first auxiliary flap 340 and inner portion 352 of second auxiliary flap 350 respectively extend over the inside surface of first elongate flange 310 and the inside surface of second elongate flange 320 so as to connect at corner 330. As such, the arrangement illustrated in FIG. 4 allows the first auxiliary flap and the second auxiliary flap to cover a greater surface area of the joint support.

Figure 5:
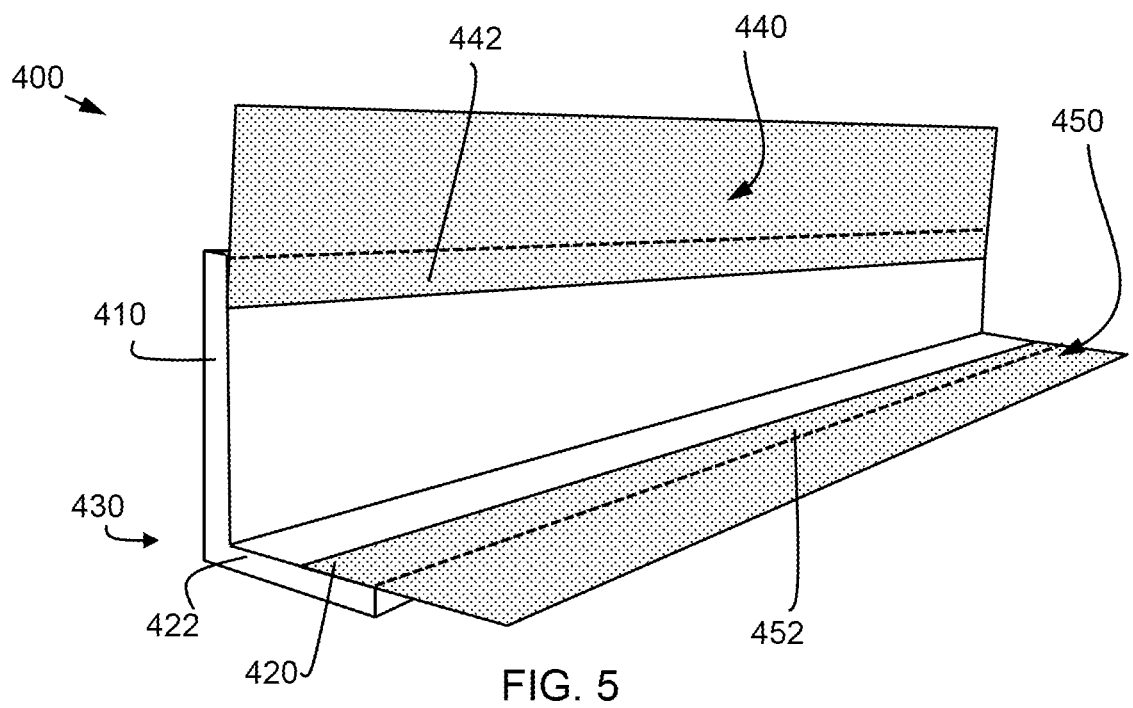
FIG. 5 is a schematic perspective view of a building surface accessory or joint support according to yet another embodiment of the disclosure.

In certain embodiments of the joint support as otherwise described herein, the inner portion of the first auxiliary flap is spaced at least 1 inch from the corner, and the inner portion of the second auxiliary flap is spaced at least 1 inch from the corner. Such a joint support is shown in FIG. 5. Joint support 400 includes an elongated body having first elongate flange 410 and second elongate flange 420. First auxiliary flap 440 is attached to the inside surface of first elongate flange 410 and second auxiliary flap 450 is attached to the inside surface of second elongate flange 420. Each of first auxiliary flap 440 and second auxiliary flap 450 may include an embossed pressure-sensitive adhesive sheet, as described herein. Facing sheet 422 is disposed on the outside surfaces of first elongate flange 410 and second elongate flange 420. Furthermore, inner portion 442 of first auxiliary flap 440 and inner portion 452 of second auxiliary flap 450 are respectively attached to portions of the inside surface of first elongate flange 410 and the inside surface of second elongate flange 420 that are spaced at least 1 inch away (or alternatively spaced at least 0.25 inches, 0.5 inches, 2 inches, or 3 inches away) from corner 430. As such, the arrangement illustrated in FIG. 5 allows the first auxiliary flap and the second auxiliary flap to cover a smaller surface area of the joint support, thus saving on the amount of materials needed to manufacture the first auxiliary flap and the second auxiliary flap.

Figure 6:
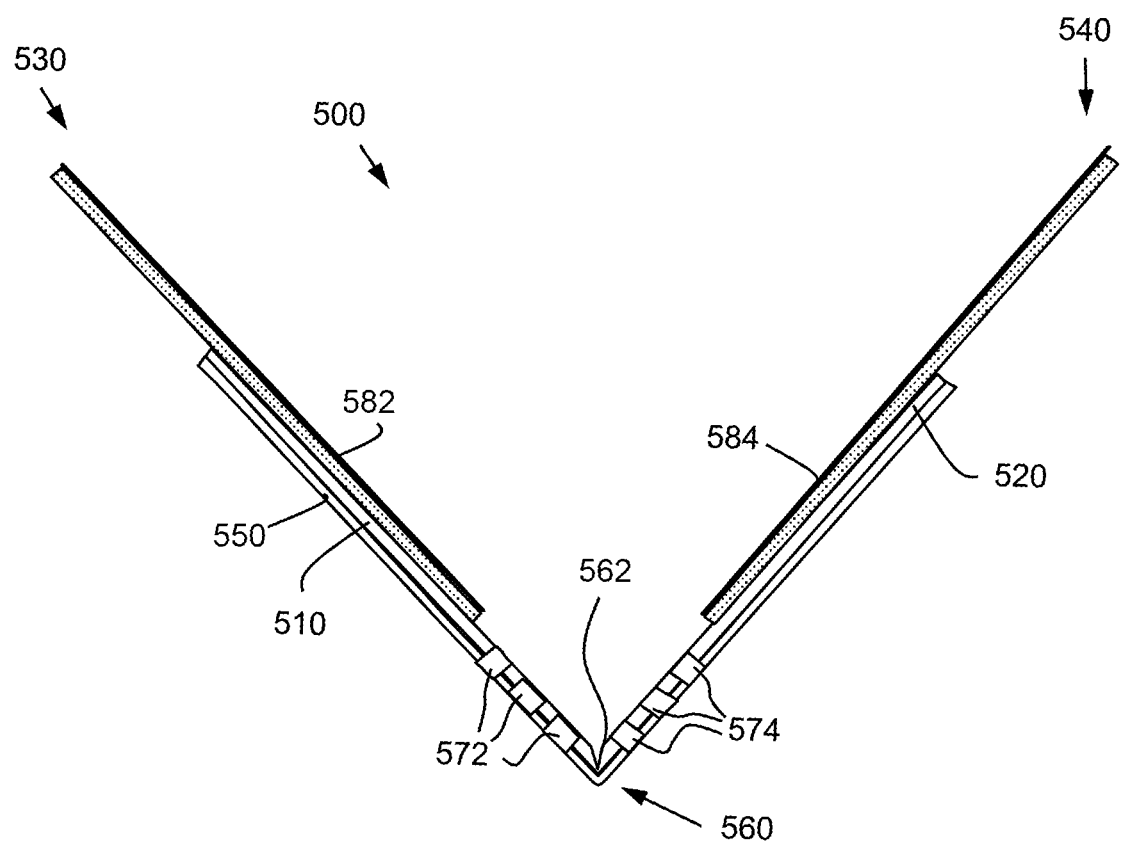
FIG. 6 is a schematic end view of a building surface accessory or joint support according to another embodiment of the disclosure.

In certain embodiments of the joint support as otherwise described herein, the corner is a sharp corner that connects the first elongate flange to the second elongate flange and a groove is disposed on an inside surface of the sharp corner. Such a joint support is shown in FIG. 6. Joint support 500 includes first elongate flange 510, second elongate flange 520, first auxiliary flap 530 attached to first elongate flange 510, second auxiliary flap 540 attached to second elongate flange 520, and facing sheet 550. Each of first auxiliary flap 530 and second auxiliary flap 540 may include an embossed pressure-sensitive adhesive sheet. First elongate flange 510 and second elongate flange 520 are connected by sharp corner 560. Sharp corner 560 provides a clean sharp corner edge where joint support 500 covers the seam between the building surface panels. Groove 562 is disposed on the inside surface of sharp corner 560. Groove 562 allows first elongate flange 510 and second elongate flange 520 to flex with respect to one another as the joint support is placed over the corner formed by the adjacent building surface panels. This allows joint support 500 to be operable with a range of angles between two building surface panels.

Figure 7:
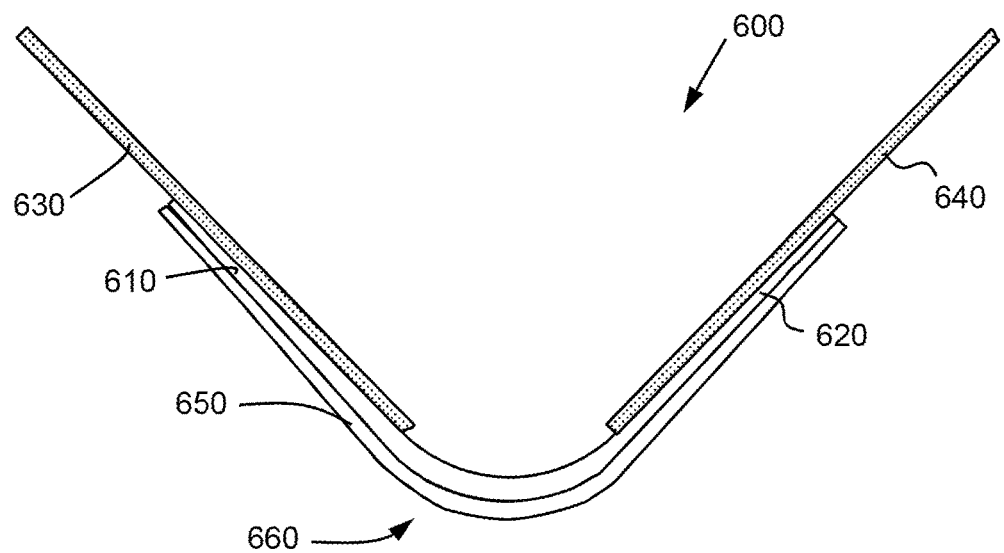
FIG. 7 is a schematic end view of a building surface accessory or joint support according to still another embodiment of the disclosure.

In certain embodiments of the joint support as otherwise described herein, the corner is a rounded corner connecting the first elongate flange and the second elongate flange so as to form a bull-nose corner bead. Such a joint support is shown in FIG. 7. Joint support 600 includes first elongate flange 610, second elongate flange 620, first auxiliary flap 630, second auxiliary flap 640, and facing sheet 650. Each of first auxiliary flap 630 and second auxiliary flap 640 may include an embossed pressure-sensitive adhesive sheet. Further, first and second elongate flanges 610, 620 are connected to one another by a rounded corner 660, such that joint support 600 is constructed as a corner bead with a bull nose configuration. Rounded corner 660 of joint support 600 allows a uniform round edge to be provided at the seam between two building surface panels that are disposed at an angle to one another.

Figure 8:
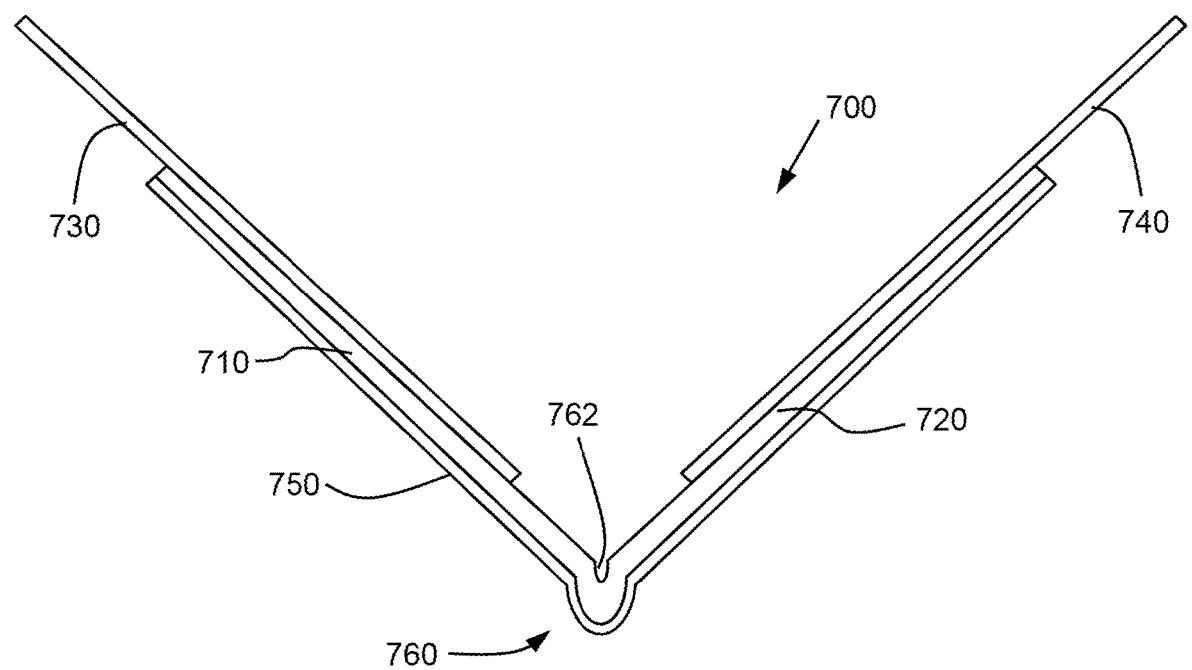
FIG. 8 is a schematic end view of a building surface accessory or joint support according to yet another embodiment of the disclosure.
Figure 9:
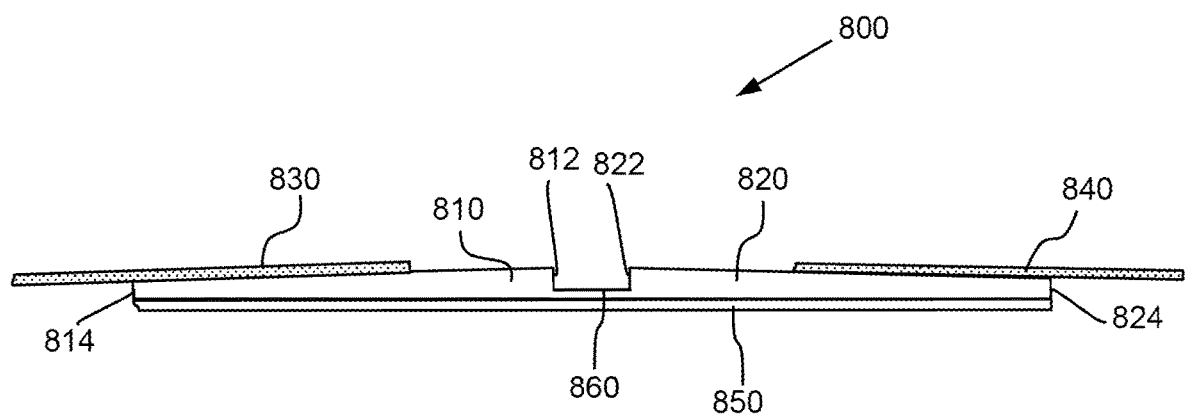
FIG. 9 is a schematic end view of a building surface accessory or joint support according to another embodiment of the disclosure.

In certain embodiments of the joint support as otherwise described herein, the joint support includes a beaded corner connecting the first elongate flange and the second elongate flange. Such a joint support is shown in FIG. 8. Joint support 700 includes first elongate flange 710, second elongate flange 720, first auxiliary flap 730 attached to first elongate flange 710, second auxiliary flap 740 attached to second elongate flange 720, and facing sheet 750. Each of first auxiliary flap 730 and second auxiliary flap 740 may include an embossed pressure-sensitive adhesive sheet, as described herein. First elongate flange 710 and second elongate flange 720 are connected by a corner that includes a beaded corner 760. Beaded corner 760 provides an outwardly projecting corner edge where joint support 700 covers the seam between the building surface panels. Groove 762 is disposed on the inside surface of sharp corner 760. The projection formed by beaded corner 760 forms an emphasized edge along the joint between the building surface panels In certain embodiments of the joint support as otherwise described herein, the corner is a flexible hinge that connects the first elongate flange to the second elongate flange. Such a joint support is shown in FIG. 9. Joint support 800 includes first elongate flange 810, second elongate flange 820, first auxiliary flap 830, second auxiliary flap 840, and facing sheet 850. Each of first auxiliary flap 830 and second auxiliary flap 840 may include an embossed pressure-sensitive adhesive sheet. First and second elongate flanges 810, 820 are connected to one another by flexible hinge 860. Flexible hinge 860 allows joint support 800 to fit over a seam between building surface panels disposed at any angle to one another, including parallel panels.

In certain embodiments of the joint support as otherwise described herein, the flexible hinge is made of a same material as the first elongate flange and the second elongate flange. In other embodiments, the flexible hinge may be made of another material, for example, paper, metal, woven fabric, non-woven fabric, nylon or other materials appreciated by those of ordinary skill in the art.

In certain embodiments of the joint support as otherwise described herein, the flexible hinge is thinner than the first elongate flange and the second elongate flange. For example, the material that forms flexible hinge 860 is thinner than the material that forms first elongate flange 810 and second elongate flange 820.

In certain embodiments of the joint support as otherwise described herein, each of the first elongate flange and the second elongate flange has a thickness in a range from 0.25 mm to 3 mm, e.g., from 0.7 mm to 2.3 mm, e.g., from 0.9 mm to 1.7 mm. As described herein, the thickness of the first elongate flange and the second elongate flange is a measure of the thickest area of the respective flange across its width.

In certain embodiments of the joint support as otherwise described herein, the first elongate flange tapers so as to decrease in thickness toward the outer edge of the first elongate flange, and the second elongate flange tapers so as to decrease in thickness toward the outer edge of the second elongate flange. For example, first elongate flange 810 of joint support 800 is thicker near inner edge 812, where it is closer to flexible hinge 860, and tapers toward outer edge 814, where it is thinner. In some examples, the thickness of first elongate flange tapers down to a thickness in a range from 0.25 mm to 1 mm, e.g., from 0.5 mm to 0.8 mm. Similarly, second elongate flange 820 is also thicker near inner edge 822, where it is closer to flexible hinge 860, and tapers toward outer edge 824, where it is thinner. In some examples, the thickness of the second elongate flange tapers down to a thickness in a range from 0.25 mm to 1 mm, e.g., from 0.5 mm to 0.8 mm.

In certain embodiments of the joint support as otherwise described herein, the joint support is a rolled product. For example, the use of flexible hinge 860 permits joint support 800 to be formed as part of a rolled product for convenient storage and transport. For example, joint support 800 is configured to be rolled along its length during storage. Upon installation of joint support 800, it is unrolled to its elongate form before being applied over any building surface panels.

In certain embodiments of the joint support as otherwise described herein, the first elongate flange and the second elongate flange are disposed at an obtuse angle. For example, the first elongate flange may be disposed at an angle greater than 90° from the second elongate flange. This property allows the joint support to be placed on any two building surface panels disposed at a right angle from one another. Accordingly, after the joint support is placed on the two building surface panels, pressure is applied to the joint support to decrease the angle between the first elongate flange and the second elongate flange to a smaller angle that is equal to the angle of the adjacent building surface panels. The pressure sensitive adhesive substance then holds the first and second auxiliary flaps against the building surface panels at the reduced angle. In some embodiments, the first elongate flange and the second elongate flange are disposed at an angle in a range from 30° to 180°, e.g., from 45° to 150°, e.g., from 60° to 120°, e.g., from 80° to 100°, e.g., from 90° to 100°, e.g., from 85° to 95°, e.g., from 91° to 95°.

In certain embodiments of the joint support as otherwise described herein, the facing sheet is a paper facing. In other embodiments of the joint support as otherwise described herein, the facing sheet is a fiber mat. Other materials, for example, fiberglass, foam materials, sponges, and absorbent fabrics, may also be used for the facing sheet, as will be appreciated by those of ordinary skill in the art. Further, in some embodiments, the facing sheet is made of another material that can hold an amount of adhesive within the structure of the facing.

In certain embodiments of the joint support as otherwise described herein, each of the first elongate flange and the second elongate flange has a width in a range from ½ inch to 5 inches, e.g., from 1 inch to 3 inches, e.g., from 1.5 inches to 2 inches.

In certain embodiments of the joint support as otherwise described herein, the joint support further includes a first release liner disposed on an inside surface of the first auxiliary flap and a second release liner disposed on an inside surface of the second auxiliary flap. Such release liners serve to prevent unwanted adhesion of the pressure sensitive adhesive substance with a building surface. For example, in joint support 500, first release liner 582 is attached to the inside surface of first auxiliary flap 530 and second release liner 584 is attached to the inside surface of second auxiliary flap 540. Before applying the joint support to a building surface, the release liners are peeled off or otherwise removed from the inside surface of the first auxiliary flap and the inside surface of the second auxiliary flap so as to allow the pressure-sensitive adhesive of the pressure-sensitive adhesive sheet disposed on the inside surface of the first auxiliary flap and the inside surface of the second auxiliary flap to adhere to the building surface.

As described above, the pressure-sensitive adhesive sheet is configured to adhere with a first adhesive strength when applied by a first pressure and a second adhesive strength when applied with a second pressure. The first adhesive strength is configured to form a releasable adhesive bond between the joint support and a building surface. For example, the joint support may initially adhere to a building surface with a first adhesive strength that allows the joint support to form a releasable bond with the building surface. Such a releasable bond ensures that the joint support does not become permanently bonded with the building surface and allows movement of the joint support around the building surface. In examples, a releasable bond means that at least 80% (or at least 90%, or at least 95%) of the pressure sensitive adhesive substance disposed the inside surface of the joint support is maintained on the joint support after removing the joint support from the building surface on which the joint support is placed.

In certain embodiments of the joint support as otherwise described herein, the second adhesive strength is configured to form a permanent adhesive bond between the joint support and a building surface. For example, the joint support may adhere to a building surface with a second adhesive strength that allows the joint support to form a permanent bond with a building surface. Such a permanent bond ensures that the joint support becomes securely bonded with the building surface and prevents the movement of the joint support around the building surface. In examples, a permanent bond means that the removal of the joint support will result in damage of the building surface on which the joint support is placed. In other examples, a permanent bond means that removal of the joint support from the building surface results in loss of the pressure sensitive adhesive substance from the joint support, as the pressure sensitive adhesive substance is left on the building surface as the joint support is removed.

In certain embodiments of the joint support as otherwise described herein, the first adhesive strength is weaker than the second adhesive strength. For example, a releasable adhesive bond with a building surface is weaker than a permanent adhesive bond with the building surface. In such embodiments, the joint support is at least temporarily repositionable during installation, allowing for adjustment of its configuration, before it is firmly attached in its final position.

In some examples, the first adhesive strength is less than 25% of the second adhesive strength. In further examples, the first adhesive strength is less than 10% of the second adhesive strength. The ratio of the first adhesive strength to the second adhesive strength can be adjusted during manufacturing by adjusting the size and/or density of the raised portions in the embossing pattern, thereby adjusting the percentage of the surface area of the inner surface covered by the raised portions.

As described above, the adhesive strength exhibited by the pressure sensitive adhesive substance depends on the amount of pressure applied on the joint support. That is, for a given range of pressures, the greater the pressure applied on the joint support with respect to a building surface, the stronger the adhesive bond between the joint support and the building surface. Above this range of pressures, the full surface of the adhesive contacts the building surface and thus the amount of adhesion no longer increases with pressure. In some embodiments, the pressure required to permanently adhere the joint support to a building surface (e.g., transition the joint support from having a releasable bond with the building surface to having a permanent bond with a building surface) is moderate, e.g., that applied by a builder, for example by hand or with a rolling tool. In other embodiments, the pressure required to permanently adhere a joint support to a building surface is large, e.g., tens to hundreds of psi, and can be applied by a specialized tool or a machine. As will be appreciated by those of skill in the art, the necessary pressure to cause the joint support to permanently adhere to a building surface can depend on the pressure-sensitive adhesive substance formulation, the rigidity of the pressure-sensitive adhesive sheet, the height of the raised portions, and other considerations such as the integrity of the building surface panels and the elongated body of the joint support.

In certain embodiments of the joint support as otherwise described herein, the first auxiliary flap and second auxiliary flap are formed of paper. In other embodiments of the joint support as otherwise described herein, the first auxiliary flap and the second auxiliary flap are formed of plastic or another material. For example, in some embodiments the first auxiliary flap and the second auxiliary flap are formed of a fiber mat.

In certain embodiments of the joint support as otherwise described herein, the pressure sensitive-adhesive sheet is disposed on the inside surface of the outer portion of the first auxiliary flap and the inside surface of the outer portion of the second auxiliary flap. In other embodiments of the joint support as otherwise described herein, the pressure-sensitive adhesive sheet is disposed on the inside surface of the inner portion of the first auxiliary flap and the inside surface of the inner portion of the second auxiliary flap. In yet other embodiments of the joint support as otherwise described herein, the pressure-sensitive adhesive sheet is disposed on the inside surface of the outer portion of the first auxiliary flap, the inside surface of the inner portion of the first auxiliary flap, and the inside surface of the outer portion of the second auxiliary flap, and the inside surface of the inner portion of the second auxiliary flap.

In certain embodiments of the joint support as otherwise described herein, the joint support includes perforations therethrough. For example, joint support 500 includes perforations 572 that extend through facing sheet 550 and first elongate flange 510 and perforations 574 that extend through facing sheet 550 and second elongate flange 520. Perforations 572 and 574 allow a joint compound to extend through the joint support 500, which enhances the connection of the joint support 500 to any building surface panels on which it is secured.

In certain embodiments of the joint support as otherwise described herein, the perforations are positioned in sections of the joint support in which the first auxiliary flap and the second auxiliary flap are not disposed. For example, as shown in FIG. 6, perforations 572 occur in a section of joint support 500 in which first auxiliary flap 530 is not disposed and perforations 574 occur in a section of joint support 500 in which second auxiliary flap 540 is not disposed.

Figure 10:
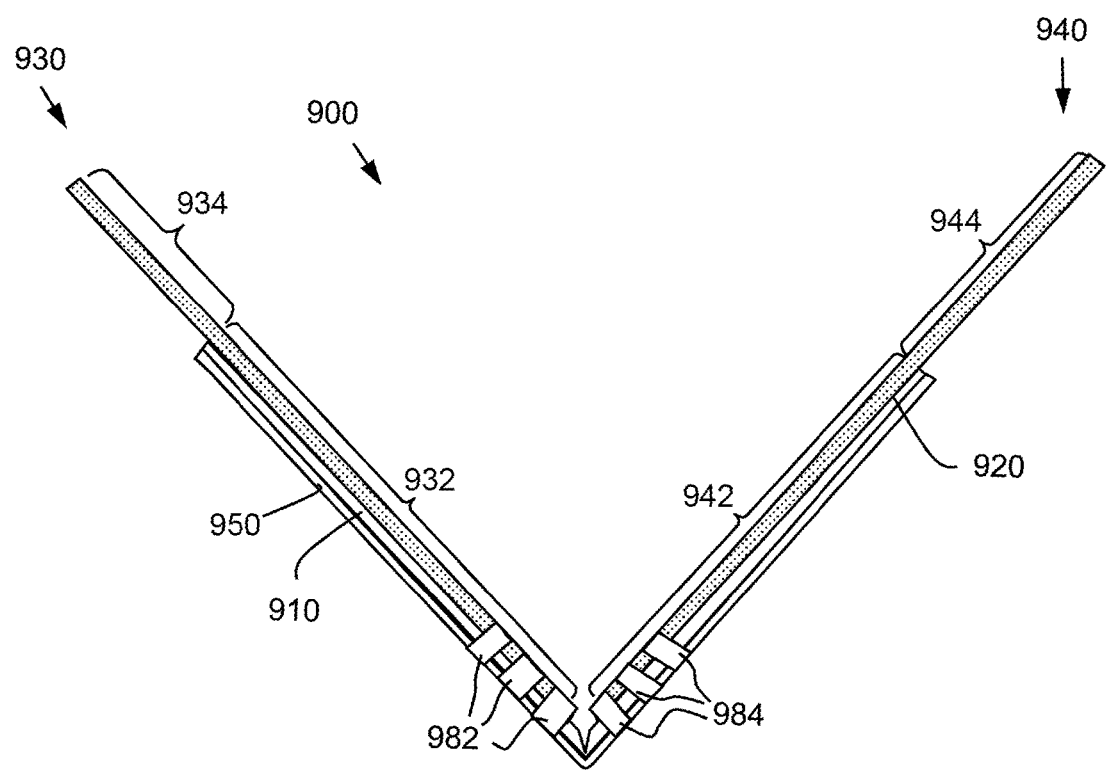
FIG. 10 is a schematic end view of a building surface accessory or joint support according to another embodiment of the disclosure.

In certain embodiments of the joint support as otherwise described herein, the joint support includes first perforations in sections of the joint support that coincide with the inner portion of the first auxiliary flap and the joint support includes second perforations in sections of the joint support that coincide with the inner portion of the second auxiliary flap. Such a joint support is shown in FIG. 10. Joint support 900 includes first elongate flange 910, second elongate flange 920, first auxiliary flap 930 attached to first elongate flange 910, second auxiliary flap 940 attached to second elongate flange 920, and facing sheet 950. Each of first auxiliary flap 930 and second auxiliary flap 940 may include an embossed pressure-sensitive adhesive sheet. First auxiliary flap 930 includes inner portion 932 and outer portion 934. Second auxiliary flap 940 includes inner portion 942 and outer portion 944. As shown, perforations 982 extend through facing sheet 950, first elongate flange 910, and inner portion 932 of first auxiliary flap 930 and perforations 984 extend through facing sheet 950, second elongate flange 920, and inner portion 942 of second auxiliary flap 940.

Figure 11:
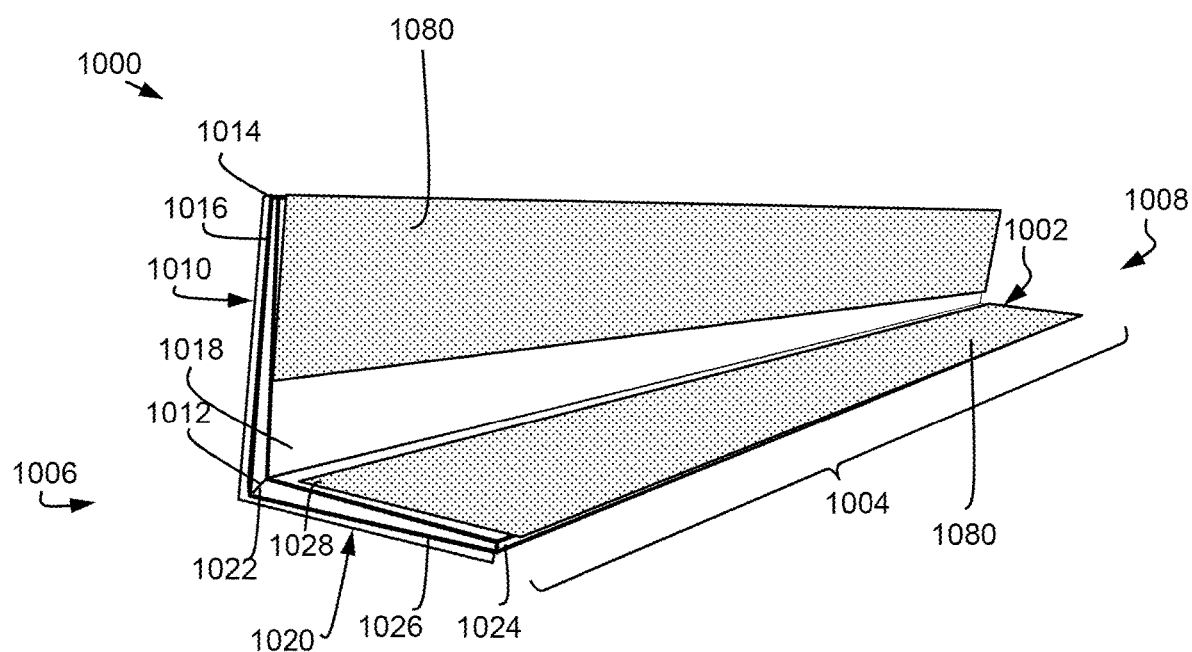
FIG. 11 is a schematic perspective view of a building surface accessory or joint support according to yet another embodiment of the disclosure.

In some embodiments, a joint support building surface accessory does not include auxiliary flaps. Such a joint support building surface accessory is shown in perspective view in FIG. 11. As shown in FIG. 11, the building surface accessory or joint support 1000 includes elongated body 1002 that has length 1004, first end 1006 and second end 1008. Length 1004 is the largest dimension of elongated body 1002 and is substantially greater than the width or breadth of elongated body 1002. Further, first end 1006 and second end 1008 are defined with respect to length 1004. Elongated body 1002 includes first elongate flange 1010 and second elongate flange 1020. First elongate flange 1010 has inner edge 1012, outer edge 1014, outside surface 1016, and inside surface 1018. Similarly, second elongate flange 1020 has inner edge 1022, outer edge 1024, outside surface 1026, and inside surface 1028. The first elongate flange 1010 is tapered so as to be thinner proximate the outer edge 1014 than it is proximate the inner edge 1012. Similarly, the second elongate flange 1020 is tapered so as to be thinner proximate the outer edge 1024 than proximate the inner edge 1022.

The inside surface 1018 and 1028 form the inside surface of the elongated body 1002. Similarly, the outside surfaces 1016 and 1026 form the outside surface of the elongated body 1002. Notably, inside surface 1018 and inside surface 1028 are elements of joint support 1000 that face towards a building surface whereas outside surface 1016 and outside surface 1026 are elements of joint support 1000 that face away from a building surface (e.g., face the interior of a room). Furthermore, inner edge 1012 and inner edge 1022 are elements of joint support 1000 that are proximate to a center of joint support 1000 whereas outer edge 1014 and outer edge 1024 are elements of joint support 100 that are at distal areas of joint support 1000.

Joint support 1000 also includes pressure-sensitive adhesive sheets 1080. The pressure-sensitive adhesive sheets 1080 are coupled to the inside surfaces 1016 and 1026 of the first and second elongate flanges 1010 and 1020 respectively. The pressure-sensitive adhesive sheets 1080 are substantially similar to the adhesive sheets 30 and 180 described above. For example, the pressure-sensitive adhesive sheets 1080 have an embossed pattern of raised portions and corresponding valleys, enabling two different adhesion strengths based on the application pressure.

In some forms, the joint support 1000 further includes apertures extending through the first elongate flange 1010 and the second elongate flange 1020. The apertures allow joint compound applied to the outer surface of the flanges 1010, 1020 to reach the building surface.

In certain embodiments of the building surface accessory or joint support as otherwise described herein, the elongated body is formed of plastic. For example, the elongated body may include at least one of High Density Polyethylene (HDPE), Polyethylene Terephthalate (PET), Acrylonitrile Butadiene Styrene (ABS) copolymer, Acrylonitrile Styrene Acrylate (ASA) copolymer, Polyvinyl Chloride (PVC), PETG, high-impact polystyrene (HIPS), Polycarbonate (PC), Polylactic Acid (PLA), or Polyester.

In certain embodiments of the building surface accessory or joint support as otherwise described herein, the elongated body is reinforced with a fibrous material. For example, in some embodiments, the elongated body is reinforced with glass fibers. In other embodiments, the elongated body is reinforced with cellulous or other fibers. In other embodiments of the building surface accessory or joint support as otherwise described herein, the elongated body is formed of metal. For example, in some embodiments, the elongated body is formed of steel. In other embodiments, the elongated body is formed of aluminum or an aluminum alloy. In still further embodiments, the elongated body is formed of wood or a wood product, such as particle board or fiberboard.

In certain embodiments of the joint support as otherwise described herein, the building surface accessory is a corner bead. For example, joint support 100, shown in FIGS. 2A and 2B, is a corner bead that is configured to cover a joint between two panels that meet at a corner of a building surface.

In certain embodiments of the building surface accessory as otherwise described herein, the length of the building surface accessory is in a range from 4 feet to 20 feet, e.g., from 6 feet to 15 feet, e.g., from 8 feet to 12 feet.

A variety of pressure sensitive adhesives are suitable for use in the building surface accessories and methods of the disclosure. Pressure sensitive adhesives are typically based on an elastomeric material, often with a tackifier to provide stickiness. In certain embodiments of the building surface accessory as otherwise described herein, the pressure sensitive adhesive substance is based on an acrylic polymer, e.g., based on one or more acrylate or methacrylate monomers such as acrylic acid, isobutyl acrylate, n-propyl acrylate, n-butyl acrylate, ethyl acrylate, isopropyl acrylate, 2-ethylhexyl acrylate, lauryl acrylate, lauryl methacrylate, isodecyl acrylate, isooctyl acrylate, tridecyl methacrylate, tridecyl acrylate, 2-ethylhexyl methacrylate, hydroxyethyl methacrylate, and caprolactone acrylate. Other suitable systems can include epoxy resins, polyvinyl acetate, ethylene-vinyl acetate copolymer (e.g., with high vinyl acetate content); butyl rubbers, natural rubbers, nitrile rubbers, silicone rubbers, polyurethane, styrene-butadiene rubbers, styrene-isoprene rubbers, styrene block copolymers like styrene-butadiene-styrene (SBS), styrene-ethylene/butylene-styrene (SEBS), styrene-ethylene/propylene (SEP), and styrene-isoprene-styrene (SIS). A variety of tackifiers can be used, depending on the elastomer, e.g., resins (e.g. rosins and their derivates, terpenes and modified terpenes, aliphatic, cycloaliphatic and aromatic resins, hydrogenated hydrocarbon resins, and their mixtures, terpene-phenol resins (especially with ethylene-vinyl acetate adhesives)), novolacs, silicone tackifiers based on so-called "MQ" silicate resins (based on monofunctional trimethylsilane reacted with silicon tetrachloride, especially for silicone rubbers). Many other adhesives and adhesive precursors are known in the art with different modes of operation and may be used as the pressure sensitive adhesive substance. The pressure sensitive adhesive substance can be selected to provide compatibility with the other materials and provide a necessary amount of strength to bond with a building surface.

In certain embodiments of the building surface accessory as otherwise described herein, the pressure sensitive adhesive substance includes a temperature-induced phase change material. In certain embodiments, this material serves to structurally or chemically stabilize the pressure sensitive adhesive substance unless the temperature is raised to a certain point, at which the phase change occurs and the stabilization removed. In some embodiments, the phase change material rigidly prevents components of the pressure sensitive adhesive substance from reacting chemically. In some embodiments, the phase change material acts as a solvent upon melting. Examples of such materials include n-docosane, n-eicosane, n-heneicosane, n-heptacosane, n-heptadecane, n-hexacosane, n-hexadecane, n-nonadecane, n-octasane, n-octadecane, n-pentacosane, n-pentadecane, n-tetracosane, n-tetradecane, n-tricosane, and n-tridecane. More generally, any material that undergoes a change in phase within a useful temperature range is desirable and may be included as a component of the pressure sensitive adhesive substance.

In certain embodiments of the building surface accessory as otherwise described herein, the pressure sensitive adhesive substance includes a stabilizing agent. In certain embodiments, stabilizing agents serve to prevent unwanted reactivity during manufacture, storage, or installation of the pressure sensitive adhesive substance. In some embodiments, stabilizing agents also guard against accidental exposure to light, heat, or oxygen that would otherwise serve to degrade the performance of the pressure sensitive adhesive substance. Examples of useful stabilizing agents that are included as a component of the pressure sensitive adhesive substance include certain plastic materials such as 2,2-dimethyloyl-1,3-propanediol and 2-hydroxymethyl-2-methyl-1,3-propandiol and the like.

In another aspect, the disclosure provides a building surface construction including a first building surface panel and a second building surface panel adjacent to the first building surface panel so as to form a seam between the first building surface panel and second building surface panel. A building surface accessory, such as a joint support, is disposed over the first building surface panel and the second building surface panel and covers at least a portion of the seam. The joint support is secured to the first building surface panel and the second building surface panel by means of a pressure sensitive adhesive substance disposed on the inside surface of the joint support, as described above. The joint support may include any of the features of the joint supports as described above.

Figure 12:
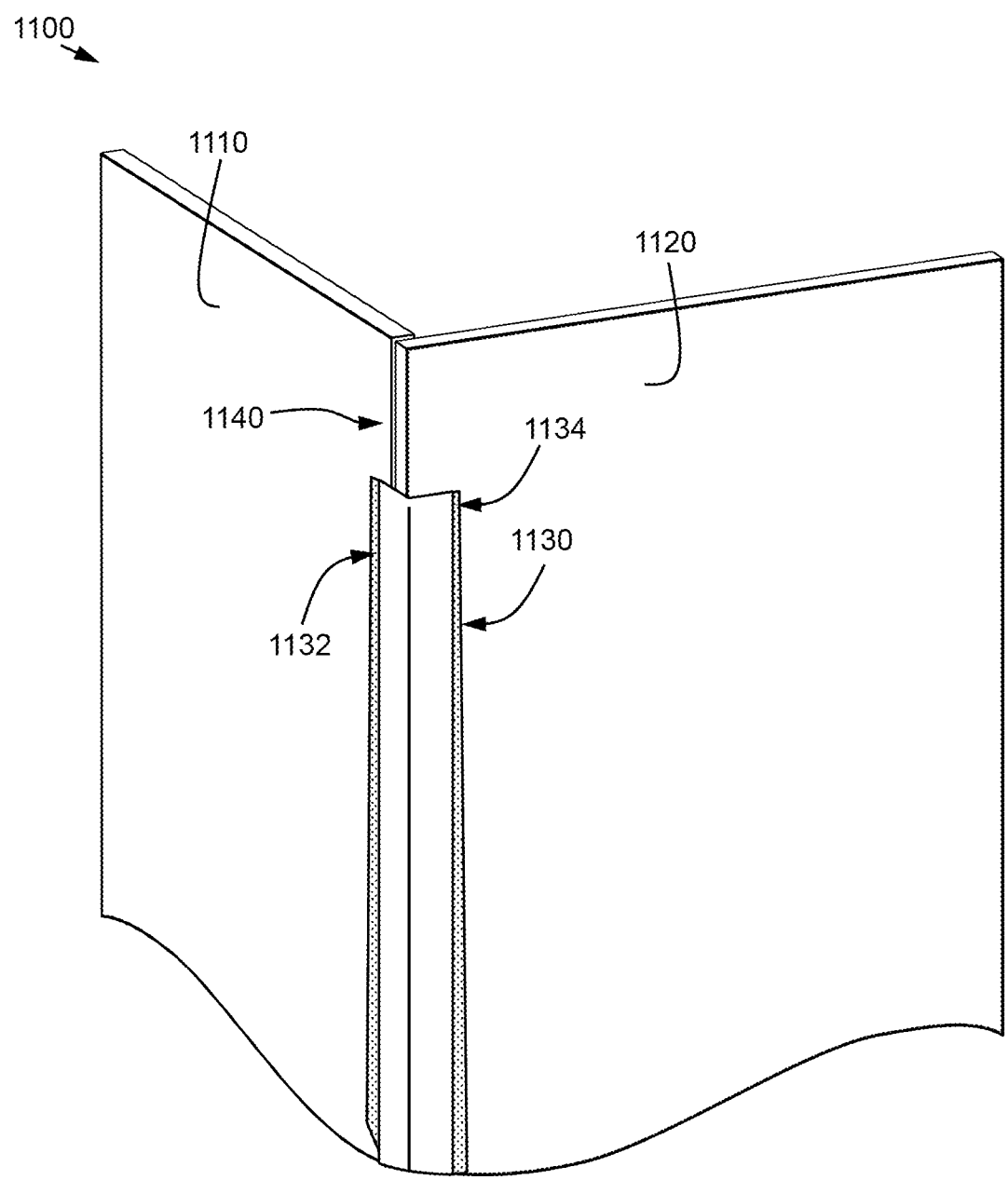
FIG. 12 is a schematic perspective view of a building surface construction according to an embodiment of the disclosure.

Such a building construction is shown in perspective view in FIG. 12. Building construction 1100 includes first building surface panel 1110 and second building surface panel 1120. A building surface accessory, such as a joint support 1130 is placed over an edge of a first building panel 1110 and an edge of a second building panel 1120 so as to cover a portion of a seam 1140 between the two building surface panels. In the depicted embodiment, joint support 1130 is positioned at a distance from the upper edges of first building panel 1110 and second building panel 1120. However, in other embodiments, the joint support extends to the edge of the panels and the portion of the seam that is covered is the entire seam. Further, joint support 1130 includes first auxiliary flap 1132 and second auxiliary flap 1134. The inside surface of both first auxiliary flap 1132 and second auxiliary flap 1134 includes a pressure sensitive adhesive substance that enables joint support 1130 to adhere to first building surface panel 1010 and second building surface panel 1120.

In certain embodiments of the building surface construction as otherwise described herein, the first and second building surface panels are drywall panels. In other embodiments, the building surface panels have other forms, such as cement boards or concrete panels. For example, in some embodiments, each of the building surface panels is a panel that includes a gypsum core surrounded by a facing material, such as a paper facing, fiber mat or fiberglass facing.

In certain embodiments of the building surface construction as otherwise described herein, the first building surface panel and the second building surface panel are disposed at an angle of about 90°, e.g., in a range from 87° to 93° degrees. In other embodiments of the joint support as otherwise described herein, the first building surface panel and the second building surface panel are disposed at an angle in a range from 30° (e.g., acute) to 180° (e.g., flat), e.g., from 45° to 150°, e.g., from 60° to 120°, e.g., from 80° to 100°, e.g. from 85 degrees to 95 degrees.

In certain embodiments of the building surface construction as otherwise described herein, the building surface construction further includes a joint compound coating an outer surface of the facing sheet of the joint support. In some embodiments, the joint compound is spread out over the joint support and extends laterally beyond the edges of the joint support over the surfaces of the first and second building surface panels. The inclusion of such a joint compound coating on the outer surface of the facing sheet provides for a smooth transition between the joint support and the building surface panels.

In certain embodiments of the building surface construction as otherwise described herein, the building surface construction further includes a layer of paint covering the joint compound. The paint obscures the joint support and, in some embodiments, provides a continuous texture over the building surface construction across both the building surface panels and the joint support.

In certain embodiments of the building surface construction as otherwise described herein, the inside surface of the first auxiliary flap covers the outside surface of the first building surface panel and the inside surface of the second auxiliary flap covers the outside surface of second building surface panel. For example, the inside surface of first auxiliary flap 1132 is disposed over the outside surface of first building surface panel 1110 at the edge near second building surface panel 1120. Further, first auxiliary flap 1132 is adhered to the outside surface of first building surface panel 1110 using the pressure sensitive adhesive sheet. Likewise, the inside surface of second auxiliary flap 1134 is disposed over the outside surface of second building surface panel 1120 at the edge near first building surface panel 1110. Further, second auxiliary flap 1134 is adhered to the outside surface of second building surface panel 1120 also using the pressure sensitive adhesive sheet.

Figure 13:
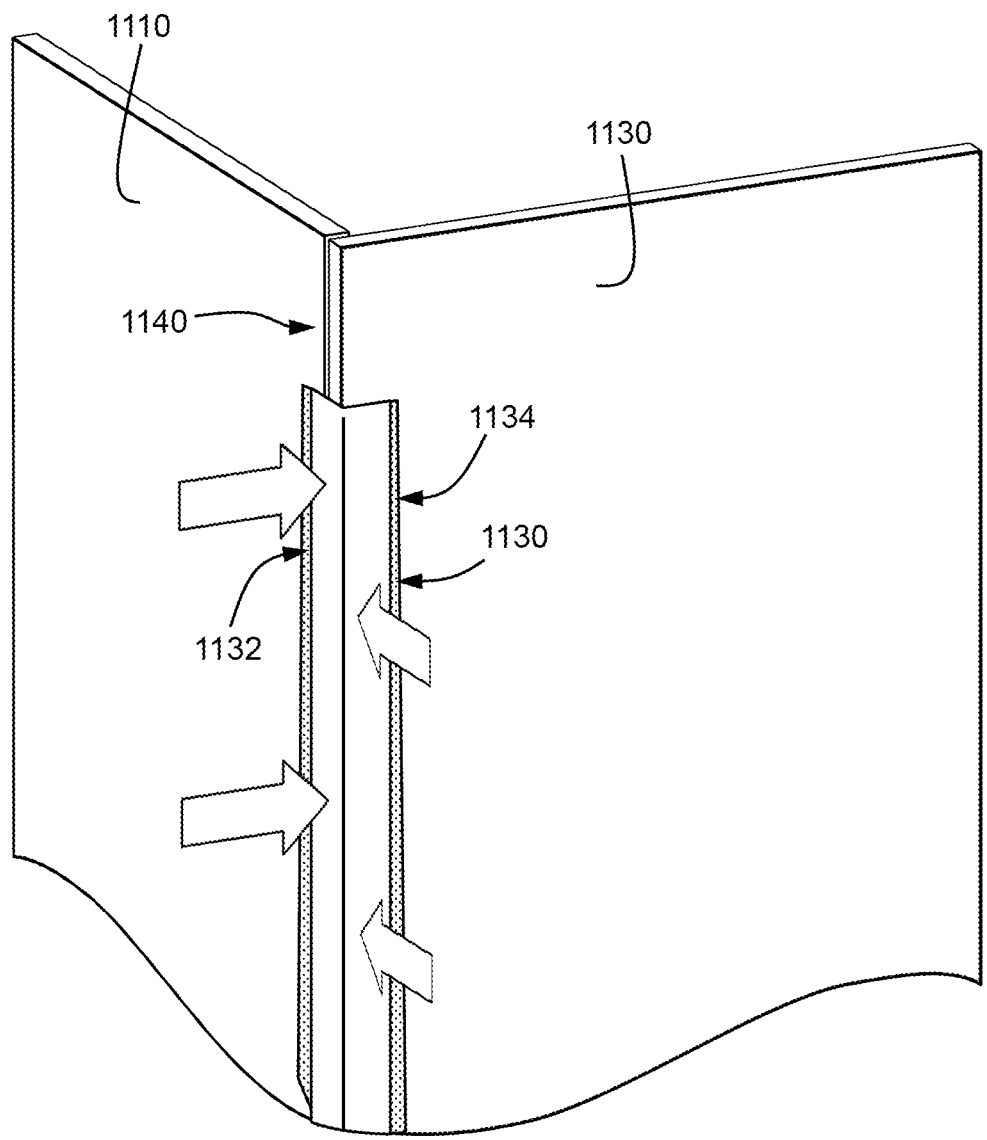
FIG. 13 is a schematic perspective view of a step in a method of securing a joint support to building surface panels according to an embodiment of the disclosure.
Figure 14:
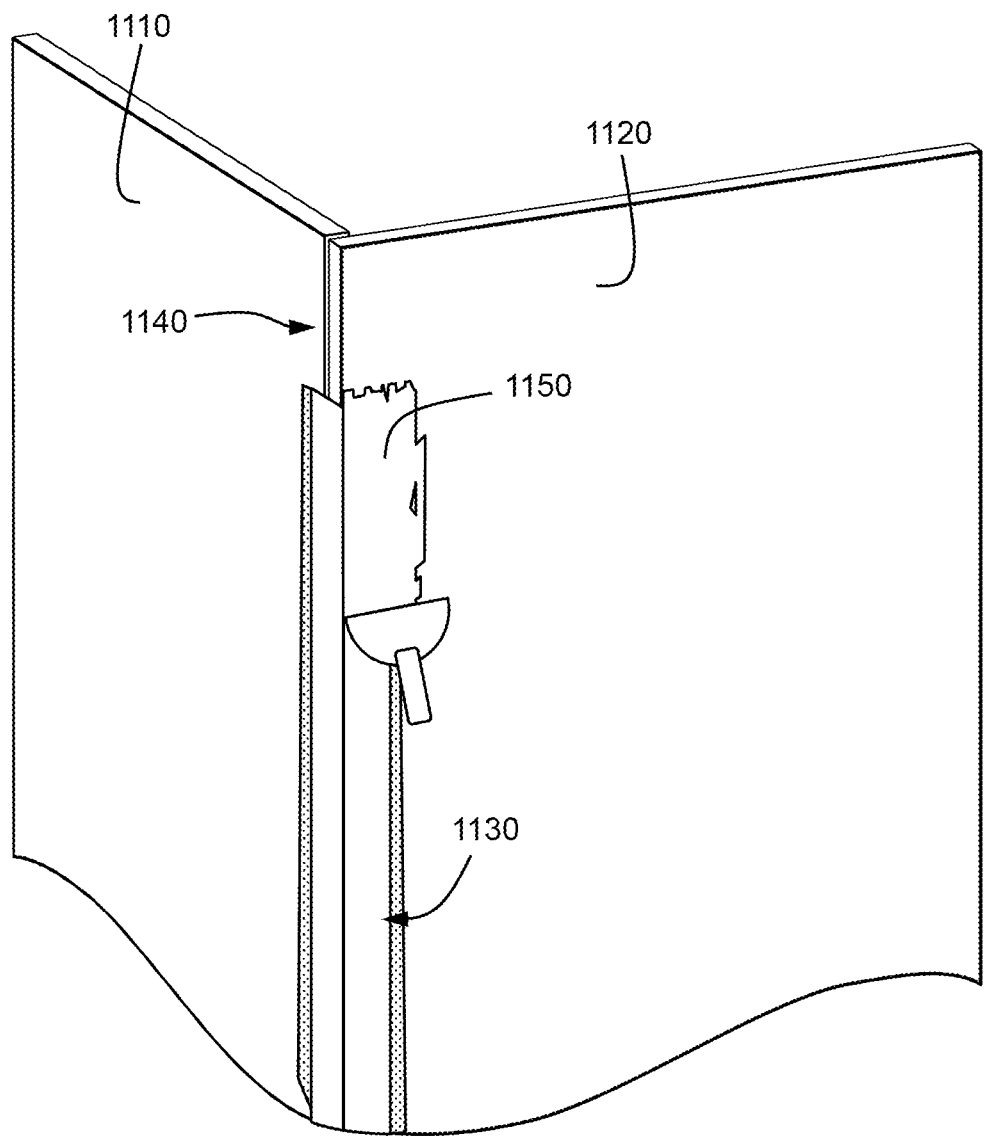
FIG. 14 is a schematic perspective view of another step in the method of FIG. 13.
Figure 15:
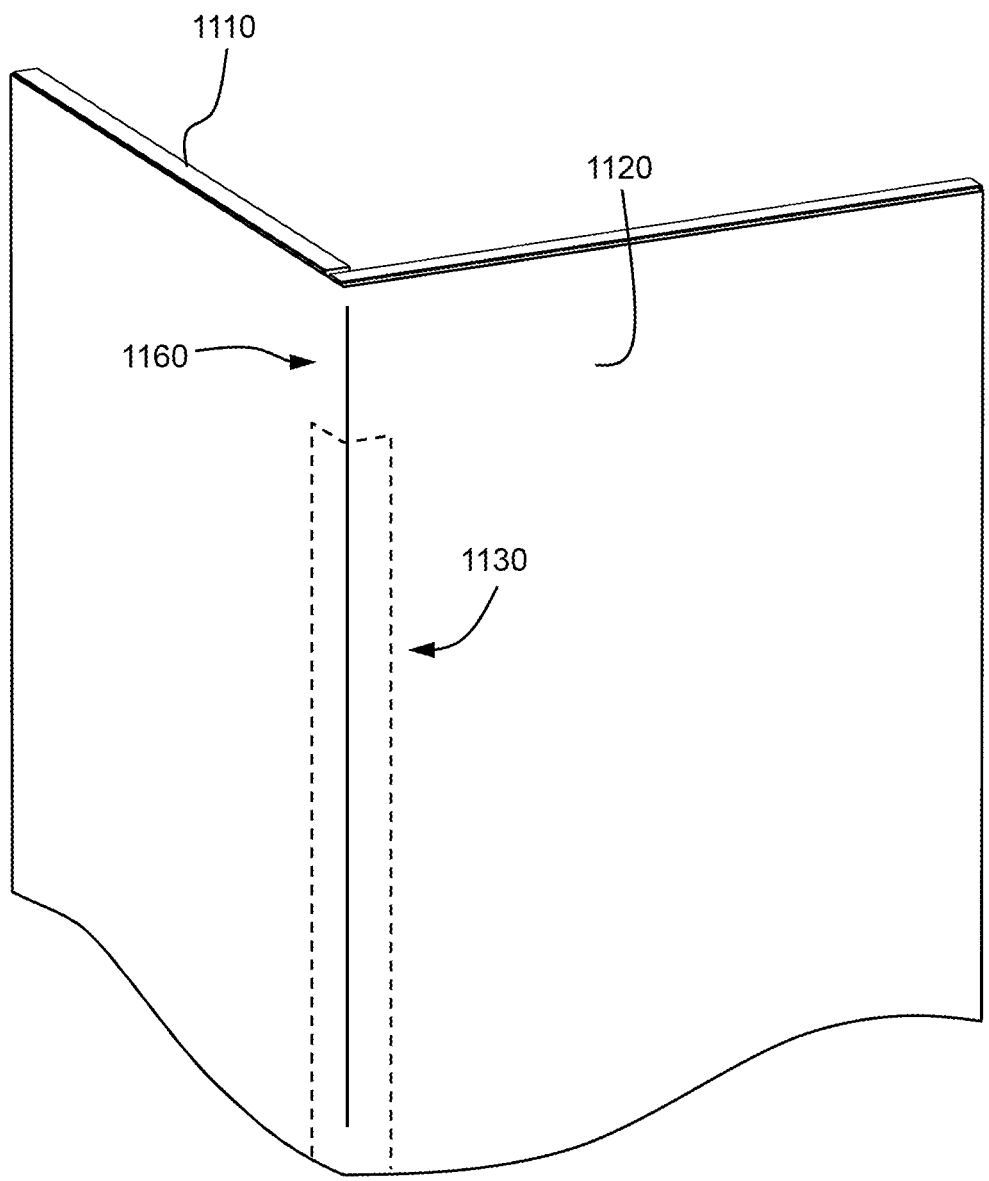
FIG. 15 is a schematic perspective view of yet another step in the method of FIG. 13.

In another aspect, the disclosure provides a method of installing a joint support according to the disclosure above on the building surface construction according to the disclosure above. Such a method is schematically depicted in FIGS. 13, 14, and 15. The method includes placing the joint support over the first building surface panel and the second building surface panel so as to cover a portion of a seam between the first and second building surface panels, where the inside surface of the first auxiliary flap is adjacent to an outside surface of the first building surface panel and where the inside surface of the second auxiliary flap is adjacent to an outside surface of the second building surface panel. The method also includes applying pressure to the joint support in order secure the joint support to the first and second building surface panels using the pressure sensitive adhesive sheet.

For example, FIG. 13 schematically depicts joint support 1130 being pressed against the corner formed by first building surface panel 1110 and second building surface panel 1120. As set forth above, in some embodiments, the pressure is applied directly by a builder, for example by hand or with a rolling a tool, while in other embodiments, the pressure is applied by a specialized tool or is applied by a machine. The application of pressure as shown in FIG. 13 deforms the raised portions of the pressure-sensitive adhesive sheets into the corresponding valleys such that the lower portions contact the building surface panels 1110 and 1120.

In certain embodiments of the method as otherwise described herein, the method further includes coating the outer surface of the paper facing of the joint support with a joint compound. Such a step is schematically depicted in FIG. 14, where a coating of joint compound 1050 is provided over a portion of joint support 1130 and second building surface panel 1120.

In certain embodiments of the method as otherwise described herein, the method further includes covering the joint compound with a layer of paint. For example, as shown in FIG. 15, in a further step, joint support 1130 is covered by a layer of paint 1160. The painted joint forms a clean and sharp corner over the seam of the building surface panels.

In certain embodiments of the method as otherwise described herein, the joint support is placed over the first and second building surface panels before the stimulus is applied to the joint support.

In certain embodiments of the method as otherwise described herein, the stimulus is initially applied to the inner portion of the first auxiliary flap and the inner portion of the second auxiliary flap and then applied to outer portion of the first auxiliary flap and the outer portion of the second auxiliary flap. This ensures that the joint support fits properly over the building surface and prevents wrinkles and ridges from forming on the joint support upon application.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

It will further be apparent that the description of the building surface accessories described above also discloses the method of manufacturing such products. For example, the products formed above can be formed by embossing a pressure sensitive adhesive sheet and then applying the embossed sheet to an elongated body, either directly or with an intermittent auxiliary flange. In some examples, the elongated body is extruded and the embossed pressure sensitive adhesive sheet and/or the auxiliary flange is applied to the still hot elongated body so as to be adhered to the elongated body as the body cools and hardens. In alternative examples, the pressure sensitive adhesive sheet is adhered to an already formed elongated body.

EMBODIMENTS

Embodiment 1. A joint support comprising:
  an elongated body having a length that extends from a first end to a second end, the elongated body comprising:
    first and second elongate flanges, each of the first and second elongate flanges extending from the first end to the second end and having an inside surface, an outside surface, an inner edge, and an outer edge;
  a first auxiliary flap including an inner portion attached to the inside surface of the first elongate flange and an outer portion that extends laterally beyond the outer edge of the first elongate flange;
  a facing sheet disposed on the outside surface of the first elongate flange and the outside surface of the second elongate flange; and
  an embossed pressure sensitive adhesive sheet disposed on at least a first portion of an inside surface of the first auxiliary flap.

Embodiment 2. The joint support according to embodiment 1, wherein the elongated body includes a corner connecting the first elongate flange and the second elongate flange.

Embodiment 3A. The joint support according to embodiment 1 or 2 wherein the joint support includes a second auxiliary flap including an inner portion attached to the inside surface of the second elongate flange and an outer portion that extends laterally beyond the outer edge of the second elongate flange, and wherein the embossed pressure sensitive adhesive sheet is disposed on at least a portion of an inside surface of the second auxiliary flap.

Embodiment 3B. The joint support according to embodiment 3A, wherein the inner portion of the first auxiliary flap and the inner portion of the second auxiliary flap connect at the corner.

Embodiment 4. The joint support according to embodiment 3A, wherein the inner portion of the first auxiliary flap is spaced at least 1 inch from the corner and wherein the inner portion of the second auxiliary flap is spaced at least 1 inch from the corner.

Embodiment 5. The joint support according to any of embodiments 2 to 4, wherein the corner is a sharp corner that connects the first elongate flange to the second elongate flange and wherein a groove is disposed on an inside surface of the sharp corner.

Embodiment 6. The joint support according to any of embodiments 2 to 4, wherein the corner is a rounded corner connecting the first elongate flange and the second elongate flange so as to form a bull-nose corner bead.

Embodiment 7. The joint support according to any of embodiments 2 to 4, wherein the corner is a flexible hinge that connects the first elongate flange to the second elongate flange.

Embodiment 8. The joint support according to embodiment 7, wherein the flexible hinge is made of a same material as the first elongate flange and the second elongate flange.

Embodiment 9A. The joint support according to embodiment 7 or embodiment 8, wherein the flexible hinge is thinner than the first elongate flange and the second elongate flange.

Embodiment 9B. The joint support according to any of embodiments 7 to 9A, wherein the first elongate flange has a first width and the second elongate flange has a second width equal to the first width.

Embodiment 10. The joint support of any of embodiments 1 to 9B, wherein each of the first elongate flange and the second elongate flange has a thickness in a range from 0.25 mm to 3 mm, e.g., from 0.25 mm to 1 mm, e.g., from 0.5 mm to 0.8 mm.

Embodiment 11. The join support according to any of embodiments 1 to 10, wherein the first elongate flange tapers so as to decrease in thickness toward the outer edge of the first elongate flange, and wherein the second elongate flange tapers so as to decrease in thickness toward the outer edge of the second elongate flange.

Embodiment 12. The joint support according to any of embodiments 1 to 11, wherein the first elongate flange and the second elongate flange are disposed at an obtuse angle.

Embodiment 13. The joint support according to any of embodiments 1 to 11, wherein the first elongate flange and the second elongate flange are disposed at an angle in a range from 80° to 100°, e.g., from 91° to 95°.

Embodiment 14. The joint support according to any of embodiments 1 to 13, wherein the facing sheet is a paper facing.

Embodiment 15. The joint support according to any of embodiments 1 to 14, wherein each of the first elongate flange and the second elongate flange has a width in a range from ½ inch to 5 inches, e.g., from 1 inch to 3 inches, e.g., from 1.5 inches to 2 inches.

Embodiment 16. The joint support according to any of embodiments 1 to 15, further comprising a first release liner disposed on an inside surface of the first auxiliary flap and a second release liner disposed on an inside surface of the second auxiliary flap.

Embodiment 17. The joint support according to any of embodiments 1 to 16, wherein the embossed pressure sensitive adhesive sheet is configured to transition from having a first adhesive strength to having a second adhesive strength upon application of pressure.

Embodiment 18. The joint support according to embodiment 17, wherein the pressure is causes the deformation of a plurality of raised portions of the embossed pressure sensitive adhesive sheet.

Embodiment 19. The joint support according to embodiment 17 or embodiment 18, wherein the first adhesive strength is weaker than the second adhesive strength.

Embodiment 20. The joint support according to any of embodiments 17 to 19, wherein the first adhesive strength is configured to form a releasable adhesive bond between the joint support and a building surface.

Embodiment 21. The joint support according to any of embodiments 17 to 20, wherein the second adhesive strength is configured to form a permanent adhesive bond between the joint support and a building surface.

Embodiment 22. The joint support according to any of embodiments 1 to 21, wherein the first auxiliary flap and the second auxiliary flap are formed of paper.

Embodiment 23. The joint support according to any of embodiments 1 to 22, wherein the embossed pressure sensitive adhesive sheet is disposed on an inside surface of the outer portion of the first auxiliary flap.

Embodiment 24. The joint support according to any of embodiments 1 to 23, further comprising:
  first perforations in sections of the joint support that coincide with the inner portion of the first auxiliary flap, and
  second perforations in sections of the joint support that coincide with the inner portion of the second auxiliary flap.

Embodiment 25. The joint support according to any of embodiments 1 to 24, wherein the elongated body is formed of plastic.

Embodiment 26. The joint support according to embodiment 25, wherein the elongated body includes at least one of High Density Polyethylene (HDPE), Polyethylene Terephthalate (PET), Acrylonitrile Butadiene Styrene (ABS) copolymer, Acrylonitrile Styrene Acrylate (ASA) copolymer, Polyvinyl Chloride (PVC), PETG, high-impact polystyrene (HIPS), Polycarbonate (PC), Polylactic Acid (PLA), or Polyester.

Embodiment 27. The joint support according to any of embodiments 1 to 26, wherein the joint support is a corner bead.

Embodiment 28. The joint support according to any of embodiments 1 to 27, wherein the length is in a range from 4 feet to 20 feet, e.g., from 6 feet to 15 feet, e.g., from 8 feet to 12 feet.

Embodiment 29. The joint support according to any of embodiments 1 to 28, wherein the embossed pressure sensitive adhesive sheet includes at least one polymer selected from acrylic polymers, e.g., based on one or more acrylate or methacrylate monomers such as acrylic acid, isobutyl acrylate, n-propyl acrylate, n-butyl acrylate, ethyl acrylate, isopropyl acrylate, 2-ethylhexyl acrylate, lauryl acrylate, lauryl methacrylate, isodecyl acrylate, isooctyl acrylate, tridecyl methacrylate, tridecyl acrylate, 2-ethylhexyl methacrylate, and caprolactone acrylate, epoxy resins, polyvinyl acetate, ethylene-vinyl acetate copolymers (e.g., with high vinyl acetate content); butyl rubbers, natural rubbers, nitriles, silicone rubbers, polyurethane, styrene-butadiene rubbers, styrene-isoprene rubbers, and styrene block copolymers like styrene-butadiene-styrene (SBS), styrene-ethylene/butylene-styrene (SEBS), styrene-ethylene/propylene (SEP), and styrene-isoprene-styrene (SIS).

Embodiment 30. The joint support according to any of embodiments 1 to 29, wherein the joint support is a rolled product.

Embodiment 31. A building surface construction using the joint support of any of embodiments 1 to 30, the building surface construction comprising:
  a first building surface panel;
  a second building surface panel adjacent to the first building surface panel so as to form a seam between the first building surface panel and the second building surface panel; and
  the joint support disposed over the first building surface panel and the second building surface panel and covering at least a portion of the seam, wherein the embossed pressure sensitive adhesive sheet secures the joint support to the first and second building surface panels.

Embodiment 32. The building surface construction according to embodiment 31, wherein the first and second building surface panels are drywall panels.

Embodiment 33. The building surface construction according to embodiment 31 or 32, wherein the first building surface panel and the second building surface panel are disposed at an angle of about 90°.

Embodiment 34. The building surface construction of any of embodiments 31 to 33, further comprising a joint compound coating an outer surface of the facing sheet of the joint support.

Embodiment 35. The building surface construction according to embodiment 34, further comprising a layer of paint covering the joint compound.

Embodiment 36. The building surface construction according to any of embodiments 31 to 35, wherein the inside surface of first auxiliary flap is disposed over an outside surface of first building surface panel and the inside surface of second auxiliary flap covers an outside surface of second building surface panel.

Embodiment 37. A method of installing the joint support according to any of embodiments 1 to 30 so as to form the building surface according to any of embodiments 31 to 36, the method comprising:
  placing the joint support over the first building surface panel and the second building surface panel so as to cover at least a portion of a seam between the first and second building surface panels, wherein the inside surface of the first auxiliary flap is adjacent to an outside surface of the first building surface panel, and wherein the inside surface of the second auxiliary flap is adjacent to an outside surface of the second building surface panel;

applying a pressure to the joint support in order to secure the joint support to the first and second building surface panels using the embossed pressure sensitive adhesive sheet.

Embodiment 38. The method according to embodiment 37, wherein the pressure causes deformation of a plurality of raised portions of the embossed pressure sensitive adhesive sheet.

Embodiment 39. The method according to embodiment 37 or embodiment 38, further comprising coating the outer surface of the facing sheet of the joint support with a joint compound.

Embodiment 40. The method according to any of embodiments 37 to 39, further comprising covering the joint compound with a layer of paint.

Embodiment 41. The method according to any of embodiments 37 to 40, wherein the joint support is placed over the first and second building surface panels before the pressure is applied to the joint support.

Embodiment 42. The method according to any of embodiments 37 to 41, wherein the pressure is initially applied to the inner portion of the first auxiliary flap and the inner portion of the second auxiliary flap and then applied to outer portion of the first auxiliary flap and the outer portion of the second auxiliary flap.

Embodiment 43. A building surface accessory comprising:
   an elongated body having a length that extends from a first end to a second end, the elongated body having an inside surface, an outside surface, a first edge, and a second edge;
   an adhesive sheet having an outside surface coupled to the elongated body, an inside surface, and pressure sensitive adhesive on at least a portion of the inside surface, wherein the adhesive sheet is embossed such that the pressure sensitive adhesive has a plurality of raised portions.

Embodiment 44. The building surface accessory according to embodiment 43 wherein the outside surface of the adhesive sheet is spaced from the elongated body proximate the plurality of raised sections.

Embodiment 45. The building surface accessory according to any of embodiments 43-44, wherein the building surface accessory is a corner bead.

Embodiment 46. The building surface accessory according to any of embodiments 43-45 further including an auxiliary flap including an inner portion attached to the inside surface of the elongated body and an outer portion that extends laterally beyond the first edge of the elongated body.

Embodiment 47. The building surface accessory according to embodiment 46, wherein the adhesive sheet is coupled to the elongated body via the auxiliary flap.

Embodiment 48. The building surface accessory according to any of embodiments 46-47 further including a second auxiliary flap including an inner portion attached to the inside surface of the elongated body and an outer portion that extends laterally beyond the second edge of the elongated body.

Embodiment 49. The building surface accessory according to any of embodiments 43-48, wherein the elongated body includes a first elongate flange and a second elongate flange connected at a corner.

Embodiment 50. The building surface accessory according to embodiment 49, wherein the corner is a flexible hinge that connects the first elongate flange to the second elongate flange.

Embodiment 51. The building surface accessory according to any of embodiments 49-50, wherein the first elongate flange tapers so as to decrease in thickness toward the first edge of the elongated body, and wherein the second elongate flange tapers so as to decrease in thickness toward the second edge of the elongated body.

Embodiment 52. The building surface accessory according to any of embodiments 43-51 further comprising a facing sheet disposed on the outside surface of the elongated body.

Embodiment 53. The building surface accessory according to any of embodiments 43-52, wherein the adhesive sheet is configured to transition from having a first adhesive strength to having a second adhesive strength through deformation of the raised portions upon application of pressure.

Embodiment 54. The building surface accessory according to embodiment 53, wherein the first adhesive strength is weaker than the second adhesive strength.

Embodiment 55. The building surface accessory according to any of embodiments 46-48, wherein the auxiliary flap is formed of paper.

Embodiment 56. The building surface accessory according to any of embodiments 43-55, wherein the elongated body is formed of plastic.

Embodiment 57. The building surface accessory according to any of embodiments 43-56, wherein the building surface accessory is a rolled product.

Embodiment 58. A building surface construction using a building surface accessory, such as a building surface accessory according to any of embodiments 43-57, the building surface construction comprising:
   a building surface accessory including:
      an elongated body having a length that extends from a first end to a second end, the elongated body comprising:
         first and second elongate flanges, each of the first and second elongate flanges extending from the first end to the second end and having an inside surface, an outside surface, an inner edge, and an outer edge,
      an embossed pressure-sensitive adhesive sheet disposed on at least a first portion of an inside surface of the first elongate flange;
   a first building surface panel;
   a second building surface panel adjacent to the first building surface panel so as to form a seam between the first building surface panel and the second building surface panel; and
   the building surface accessory disposed over the first building surface panel and the second building surface panel and covering at least a portion of the seam, wherein the pressure-sensitive adhesive sheet secures the building surface accessory to the first building surface panels.

Embodiment 59. The building surface construction according to embodiment 58, the building surface accessory further comprising a first auxiliary flap including an inner portion attached to the inside surface of the first elongate flange and an outer portion that extends laterally beyond the outer edge of the first elongate flange, wherein the embossed pressure-sensitive adhesive sheet is coupled to the first elongate flange by the first auxiliary flap.

Embodiment 60. The building surface construction according to embodiment 59, the building surface accessory further comprising a facing sheet disposed on the outside surface of the first elongate flange and the outside surface of the second elongate flange.

Embodiment 61. A method of installing a building surface accessory, such as a building surface accessory according to any of embodiments 43-57, the method comprising:
placing a building surface accessory over a first building surface panel and a second building surface panel so as to cover at least a portion of a seam between the first and second building surface panels, the building surface accessory comprising:
an elongated body having a length that extends from a first end to a second end, the elongated body comprising:
first and second elongate flanges, each of the first and second elongate flanges extending from the first end to the second end and having an inside surface, an outside surface, an inner edge, and an outer edge,
an embossed pressure-sensitive adhesive sheet disposed on at least a first portion of an inside surface of the first elongate flange, the embossed pressure-sensitive adhesive sheet having a plurality of raised portions;
applying a first pressure to the building surface accessory in order to secure the building surface accessory to the first building surface panel using the embossed pressure-sensitive adhesive sheet by a first adhesion strength; and
applying a second pressure greater than the first pressure to the building surface accessory in order to deform the raised portions of the embossed pressure-sensitive adhesive sheet and thereby secure the building surface accessory to the first building surface panel by a second adhesion strength greater than the first adhesion strength.

Embodiment 62. The method according to embodiment 61 wherein the building surface accessory further comprises:
a first auxiliary flap including an inner portion attached to the inside surface of the first elongate flange and an outer portion that extends laterally beyond the outer edge of the first elongate flange,
wherein the inside surface of the first auxiliary flap is adjacent to an outside surface of the first building surface panel, and
wherein the embossed pressure sensitive adhesive sheet is coupled to the first elongate flange by the first auxiliary flap; and
a facing sheet disposed on the outside surface of the first elongate flange and the outside surface of the second elongate flange.

Embodiment 63. The method according to embodiment 62, further comprising coating the outer surface of the facing sheet of the joint support with a joint compound.

Embodiment 64. The method according to embodiment 63, further comprising covering the joint compound with a layer of paint.

What is claimed is:

1. A building surface accessory comprising:
an elongated body having a length that extends from a first end to a second end, the elongated body having an inside surface, an outside surface, a first edge, and a second edge;
an adhesive sheet having an outside surface coupled to the inside surface of the elongated body, an inside surface, and a pressure sensitive adhesive on at least a portion of the inside surface of the adhesive sheet, wherein the adhesive sheet is embossed such that the pressure sensitive adhesive has a plurality of raised portions and a plurality of retracted portions,
wherein the outside surface of the adhesive sheet is spaced from the elongated body in registration with the plurality of raised portions of pressure sensitive adhesive, such that the plurality of raised portions of the pressure sensitive adhesive sheet can be deformed into cavities in the outside surface of the adhesive sheet with an application of pressure.

2. The building surface accessory of claim 1 wherein the plurality of raised portions of the pressure sensitive adhesive sheet can be deformed into the cavities with the application of pressure so as to make the plurality of raised portions substantially coplanar with the plurality of retracted portions.

3. The building surface accessory of claim 1, wherein the building surface accessory is a corner bead.

4. The building surface accessory of claim 1 wherein the adhesive sheet forms an auxiliary flap including an inner portion attached to the inside surface of the elongated body and an outer portion that extends laterally beyond the first edge of the elongated body.

5. The building surface accessory of claim 4 further including a second adhesive sheet that forms a second auxiliary flap including an inner portion attached to the inside surface of the elongated body and an outer portion that extends laterally beyond the second edge of the elongated body.

6. The building surface accessory of claim 1, wherein the adhesive sheet includes apertures extending therethrough.

7. The building surface accessory of claim 6, wherein the raised portions surround the apertures.

8. The building surface accessory of claim 1, wherein the elongated body includes a first elongate flange and a second elongate flange connected at a corner.

9. The building surface accessory of claim 8, wherein the first elongate flange has a first width and the second elongate flange has a second width equal to the first width.

10. The building surface accessory of claim 8, wherein the corner is a flexible hinge that connects the first elongate flange to the second elongate flange.

11. The building surface accessory of claim 8, wherein the first elongate flange tapers so as to decrease in thickness toward the first edge of the elongated body, and wherein the second elongate flange tapers so as to decrease in thickness toward the second edge of the elongated body.

12. The building surface accessory of claim 1 further comprising a facing sheet disposed on the outside surface of the elongated body.

13. The building surface accessory of claim 1, wherein the adhesive sheet is configured to transition from having a first adhesive strength to having a second adhesive strength through deformation of the raised portions upon application of pressure.

14. The building surface accessory of claim 13, wherein the first adhesive strength is weaker than the second adhesive strength.

15. A building surface construction using a building surface accessory, the building surface construction comprising:
the building surface accessory according to claim 1, wherein the elongated body comprises first and second elongate flanges, each of the first and second elongate flanges extending from the first end to the second end and having an inside surface, an outside surface, an inner edge, and an outer edge, wherein the adhesive sheet is coupled to the elongated body on at least a first portion of an inside surface of the first elongate flange;

a first building surface panel;

a second building surface panel adjacent to the first building surface panel so as to form a seam between the first building surface panel and the second building surface panel; and the building surface accessory disposed over the first building surface panel and the second building surface panel and covering at least a portion of the seam, wherein the adhesive sheet secures the building surface accessory to the first building surface panel, with the raised portions substantially adhering the building surface accessory to the first building surface panel and the retracted portions of the pressure-sensitive adhesive not substantially adhering the building surface accessory to the first building surface panel.

16. The building surface construction of claim 15, the building surface accessory further comprising a first auxiliary flap including an inner portion attached to the inside surface of the first elongate flange and an outer portion that extends laterally beyond the outer edge of the first elongate flange, wherein the embossed pressure-sensitive adhesive sheet is coupled to the first elongate flange by the first auxiliary flap.

17. The building surface construction of claim 16, the building surface accessory further comprising a facing sheet disposed on the outside surface of the first elongate flange and the outside surface of the second elongate flange.

18. A method of installing a building surface accessory, the method comprising:

placing the building surface accessory according to claim 1 over a first building surface panel and a second building surface panel so as to cover at least a portion of a seam between the first and second building surface panels, wherein the elongated body comprises first and second elongate flanges, each of the first and second elongate flanges extending from the first end to the second end and having an inside surface, an outside surface, an inner edge, and an outer edge, wherein the adhesive sheet is coupled to the elongated body on at least a first portion of the inside surface of the first elongate flange;

applying a first pressure to the building surface accessory in order to secure the building surface accessory to the first building surface panel using the adhesive sheet by a first adhesion strength; and then adjusting the position of the building surface accessory with respect to the first building surface panel; and then applying a second pressure greater than the first pressure to the building surface accessory in order to deform the raised portions of the adhesive sheet and thereby secure the building surface accessory to the first building surface panel by a second adhesion strength greater than the first adhesion strength.

19. The method of claim 18 wherein the building surface accessory further comprises:

a first auxiliary flap including an inner portion attached to the inside surface of the first elongate flange and an outer portion that extends laterally beyond the outer edge of the first elongate flange, wherein an inside surface of the first auxiliary flap is adjacent to an outside surface of the first building surface panel, and wherein the adhesive sheet is coupled to the first elongate flange by the first auxiliary flap; and a facing sheet disposed on the outside surface of the first elongate flange and the outside surface of the second elongate flange.

20. The method of claim 19, further comprising coating an outer surface of the building surface accessory with a joint compound.

* * * * *